(12) United States Patent
Yamaguchi et al.

(10) Patent No.: US 7,641,727 B2
(45) Date of Patent: Jan. 5, 2010

(54) ELECTRODE LEVEL DIFFERENCE ABSORBING PRINT PASTE AND METHOD OF PRODUCING ELECTRONIC DEVICE

(75) Inventors: Akira Yamaguchi, Chuo-ku (JP); Shigeki Satou, Chuo-ku (JP); Yasumichi Tokuoka, Chuo-ku (JP)

(73) Assignee: TDK Corporation, Tokyo (JP)

( * ) Notice: Subject to any disclaimer, the term of this patent is extended or adjusted under 35 U.S.C. 154(b) by 476 days.

(21) Appl. No.: 10/551,367

(22) PCT Filed: Mar. 25, 2004

(86) PCT No.: PCT/JP2004/004144

§ 371 (c)(1), (2), (4) Date: Nov. 15, 2005

(87) PCT Pub. No.: WO2004/087608

PCT Pub. Date: Oct. 14, 2004

(65) Prior Publication Data

US 2006/0191443 A1    Aug. 31, 2006

(30) Foreign Application Priority Data

Mar. 31, 2003    (JP)    ............................. 2003-095668

(51) Int. Cl.
*C04B 14/48* (2006.01)
(52) U.S. Cl. .................................... 106/31.5
(58) Field of Classification Search ............... 428/34.4; 264/614
See application file for complete search history.

(56) References Cited

U.S. PATENT DOCUMENTS

| | | | | |
|---|---|---|---|---|
| 5,429,846 A | * | 7/1995 | Sugimoto et al. | .......... 428/34.4 |
| 6,599,463 B2 | * | 7/2003 | Miyazaki et al. | ............ 264/614 |
| 2001/0006451 A1 | | 7/2001 | Miyazaki et al. | |

FOREIGN PATENT DOCUMENTS

| | | |
|---|---|---|
| GB | 2 357 280 A | 6/2001 |
| GB | 2 370 568 A | 7/2002 |
| GB | 370 569 A | 7/2002 |
| JP | A 56-94719 | 7/1981 |
| JP | A 3-74820 | 3/1991 |
| JP | A 6-206756 | 7/1994 |
| JP | A 9-106925 | 4/1997 |

(Continued)

*Primary Examiner*—Roy King
*Assistant Examiner*—Yoshitoshi Takeuchi
(74) *Attorney, Agent, or Firm*—Oliff & Berridge, PLC

(57) ABSTRACT

A production method of an electronic device comprising the steps of forming a stacked body by stacking green sheets and electrode layers having a predetermined pattern and firing the stacked body. Before forming the stacked body, a blank pattern layer is formed on a space portion of the electrode layer having a predetermined pattern. The electrode level difference absorbing print paste for forming the blank pattern layer includes at least ceramic powder and a binder resin, and a polymerization degree of the binder resin is made equal to or more than that of a binder resin included in slurry for forming the green sheet. The binder resin of the electrode level difference absorbing print paste includes polyvinyl butyral resin with a polymerization degree of 1400 or more, a butyralation degree of 64 to 74 mol % and an acetalization degree of 66 to 74 mol %.

5 Claims, 8 Drawing Sheets

FOREIGN PATENT DOCUMENTS

| | | |
|---|---|---|
| JP | A 10-67567 | 3/1998 |
| JP | A 2001-232617 | 8/2001 |
| JP | A 2001-237140 | 8/2001 |
| JP | A 2002-43161 | 2/2002 |
| JP | A 2002-43164 | 2/2002 |
| JP | A 2002-313672 | 10/2002 |

* cited by examiner

ELECTRODE LEVEL DIFFERENCE ABSORBING PRINT PASTE AND METHOD OF PRODUCING ELECTRONIC DEVICE

TECHNICAL FIELD

The present invention relates to a production method of an electronic device, such as a multilayer ceramic capacitor.

BACKGROUND ART

In recent years, as a variety of electronic equipments become compact, electronic devices to be installed inside the electronic equipments have become more compact and higher in performance. As one of the electronic devices, there is a ceramic electronic device, such as a CR built-in substrate and a multilayer ceramic capacitor, and the ceramic electronic devices have been required to be more compact and higher in performance.

To pursue a more compact ceramic electronic device having a higher capacity, there is a strong demand for making a dielectric layer thinner. Recently, a thickness of a dielectric green sheet composing a dielectric layer has become a several µm or less.

To produce a multilayer ceramic capacitor, an interlayer thickness of a sheet formed with an internal electrode is in a range of about 3 µm to 100 µm based on a desired capacitance required as a capacitor. Also, in a multilayer ceramic capacitor, a part not formed with the internal electrode is formed on an outer part in the stacking direction of the capacitor chip.

In recent years, as electronic equipments become more compact, electronic devices to be used therein have rapidly become more compact. In multilayer electronic devices as typified by a multilayer ceramic capacitor, rapid development has been made on increasing the number of layers to be stacked and attaining a thinner interlayer thickness. To respond to the technical trends, a thickness of a green sheet, which determines the interlayer thickness, has almost become 3 µm or less to 2 µm or less. Therefore, in a production process of a multilayer ceramic capacitor, it is necessary to handle extremely thin green sheets and to design very advanced green sheet properties.

As characteristics required as the properties of such an extremely thin green sheet, sheet strength, flexibility, smoothness, adhesiveness when being stacked, handlability (electrostatic property), etc. may be mentioned, and balance of a higher order is required.

Also, when alternately stacking green sheets and internal electrode layers as in a multilayer ceramic capacitor, the internal electrode layers in a predetermined pattern sandwiched by green sheets are formed with a space (blank pattern) where an electrode is not formed. Due to the blank pattern, there arises a level difference from portions where the internal electrode layer exists, consequently, delamination between sheets and deformation of a stacked body, etc. become problems. To solve the problems, as disclosed in the Japanese Unexamined Patent Publication No. 56-94719, the Japanese Unexamined Patent Publication No. 3-74820, the Japanese Unexamined Patent Publication No. 9-106925 and the Japanese Unexamined Patent Publication No. 2001-237140, a method of forming a pattern layer made by the same dielectric paste as that of the green sheets on the blank pattern portions not formed with the internal electrode has been proposed.

However, in recent years, a thickness of the internal electrode is demanded to be 1 µm or less due to a more compact electronic device with a larger capacity, so that a thickness of the blank pattern is also demanded to be 1 µm or less.

When forming an extremely thin pattern layer made by a dielectric paste on the blank pattern portion not formed with internal electrodes, it is sufficient if a content of ceramic powder is reduced in the dielectric paste. However, in this case, viscosity of the dielectric paste extremely declines, so that there arises a problem that the paste flows out from a mesh of a print plate making and printing in a predetermined pattern becomes impossible. Also, to make up for the decline of the viscosity, it may be considered to increase an amount of an organic binder included in the paste. However, in this case, there is a problem that delamination, etc. arises between sheets when performing binder removal on the stacked body.

Furthermore, in the case of forming an extremely thin blank pattern, when a conventionally general ethyl cellulose based resin is used as the binder resin of the paste, there are also problems that the strength declines and adhesive force declines as the layer becomes thinner as the layer becomes thinner.

DISCLOSURE OF THE INVENTION

An object of the present invention is to provide an electrode level difference absorbing print paste (a paste for forming a blank pattern) for printing a thin film, capable of forming a print material having excellent mechanical strength and adhesiveness. Specifically, an object of the present invention is to provide an electrode level difference absorbing print paste capable of preferably eliminate a level difference of an electrode layer between green sheets and effectively preventing delamination between sheets and deformation of a stacked body even when a thickness of the green sheet and/or electrode layer is extremely thin, and a method of producing an electronic device. Furthermore, an object of the present invention is to provide an electrode level difference absorbing print paste for forming a blank pattern having excellent adhesiveness particularly when forming a stacked body of green sheets and electrode layers by a transfer method.

The present inventors have been committed themselves to study to attain the above objects, found that it was possible to preferably eliminate a level difference of an electrode layer between green sheets and prevent delamination between sheets and deformation of a stacked body, etc. even when a thickness of the green sheet and/or electrode layer is extremely thin by making a polyvinyl butyral resin having a certain polymerization degree contained in a paste used for forming a blank pattern layer of an internal electrode layer as a binder resin, and completed the present invention.

Namely, an electrode level difference absorbing print paste according to the present invention is characterized by including ceramic powder, a binder resin, a plasticizer and a solvent, wherein the binder resin contains a polyvinyl butyral resin or a polyacetal resin, a polymerization degree of the resin is 1400 or more, a butyralation degree of the resin is 64 to 74 mol %, and an acetalization degree of the resin is 66 to 74 mol %.

According to the electrode level difference absorbing print paste according to the present invention, it becomes possible to preferably print even an extremely thin blank pattern layer without extremely declining viscosity of the electrode level difference absorbing print paste. Also, it is not necessary to increase an amount of a binder resin included in the electrode level difference absorbing print paste, so that there is a low possibility of causing delamination between sheets, etc. at the time of binder removal of the stacked body.

Preferably, a polymerization degree of a binder resin included in the electrode level difference absorbing-print paste is 1400 or more, more preferably 1700 or more, and particularly preferably 2000 or more. By using a binder resin having a polymerization degree as such, strength of a blank pattern layer is improved, strength of an electrode added sheet as a whole is improved, and handlability can be widely improved. Note that the upper limit of the polymerization degree of the binder resin is not particularly limited but is, for example, 3300 or so.

In the paste of the present invention, when a polymerization degree of the binder resin is too low, it is liable that viscosity of the electrode level difference absorbing print paste extremely declines and printing of an extremely thin blank pattern layer becomes difficult.

In the paste of the present invention, when the butyralation degree of the binder resin is too low, it is liable that the resin becomes hard to be dissolved and surface roughness after printing deteriorates, while when the butyralation degree is too high, it is liable that viscosity of the paste declines and printing becomes difficult.

In the paste of the present invention, when the acetalization degree of a binder resin is too high, it is liable that the resin becomes hard to be dissolved and surface roughness after printing deteriorates, while when the acetalization degree is too low, it is liable that viscosity of the paste declines and printing becomes difficult.

Preferably, the binder resin is contained by 3 parts by weight or more and 9 parts by weight or less, and more preferably 4 to 8 parts by weight with respect to 100 parts by weight of the ceramic powder.

When a content of the binder resin is too large, it is liable that applied film density after printing becomes low and thin film printing becomes difficult, while when the content is too low, it is liable that strength of the applied film after printing declines and handlability declines.

Preferably, the solvent contains at least one of terpineol, dihydroterpineol, terpinyl acetate, dihydroterpinyl acetate and 4-(1'-acetoxy-1'-)cyclohexanol acetate.

Preferably, the solvent is contained by 20 to 80 parts by weight, and more preferably 50 to 70 parts by weight or so with respect to a total amount of 100 parts by weight of the paste.

When the solvent amount is too small, it is liable that the binder resin becomes hard to be dissolved, while when the solvent amount is too large, it is liable that viscosity and printing becomes difficult.

Preferably, viscosity of the electrode level difference absorbing print paste when giving rotation of obtaining a shear rate of 8[1/s] is 4 to 30 Pa·s at 25° C., and more preferably 4 to 20. When viscosity of the paste is too low, printing tends to become difficult.

Preferably, ceramic powder is contained in the electrode level difference absorbing print paste at a rate of 30 to 55 wt %, more preferably 35 to 50 wt % with respect to the entire paste. When the content ratio of the ceramic powder is too small, viscosity of the paste becomes low, blur of printing, etc. arise and printing tends to become difficult. Also, when the content ratio of the ceramic powder is too large, it is liable that a print thickness becomes hard to be made thin.

Note that it is preferable to change the containing ratio of ceramic powder in accordance with a polymerization degree of the binder resin. For example, 36 to 55 wt % is preferable when the polymerization degree is 1400 to 1500, 36 to 55 wt % is preferable when the polymerization degree is 1500 to 1600, 36 to 52 wt % is preferable when the polymerization degree is 1600 to 1800, 32 to 48 wt % is preferable when the polymerization degree is 1800 to 2200, 32 to 45 wt % is preferable when the polymerization degree is 2200 to 2600, and 30 to 40 wt % is preferable when the polymerization degree is 2600 or more. As above, as the polymerization degree of the binder resin becomes high, the preferable range of the containing ratio of the ceramic powder tends to shift to the lower side.

Preferably, at least one of phthalate ester [dibutyl phthalate (DBP), dioctyl phthalate (DOP), benzylbutyl phthalate (BBP), butyl butylene glycol (BPBG)], adipic acid ester [dioctyl adipic acid (DOA)], sebacic acid ester and sebacic dibutyl is contained as the plasticizer. Among them, DBP, DOP and BBP are particularly preferable.

Preferably, in the electrode level difference absorbing print paste, the plasticizer is contained by preferably 10 to 200 parts by weight, more preferably 20 to 150 parts by weight, furthermore preferably 30 to 100 parts by weight, and particularly preferably 50 to 100 parts by weight with respect to 100 parts by weight of a binder resin.

When a content of the plasticizer is too small, a removing trouble (breaking) tends to arise, while when too large, it remains as a nonvolatile component on the applied film and rolling up of the printed matter tends to become difficult.

Preferably, in the electrode level difference absorbing print paste, at least one of a hygroscopic polymer, cation based surfactant (amine based surfactant) and amphoteric surfactant is included as an antistatic agent. As a hygroscopic polymer, ethylene glycol (EG), polyethylene glycol (PEG) and glycerin, etc. may be mentioned.

As a result that an antistatic agent is contained in the paste of the present invention, static electricity hardly arises and a removing trouble (breaking and bending, etc.) hardly arises when removing a molded sheet from a supporting sheet.

A production method of an electronic device according to a first aspect of the present invention is characterized by comprising the steps of:

forming a stacked body by stacking green sheets and electrode layers having a predetermined pattern; and firing the stacked body;

wherein before forming the stacked body, a blank pattern layer having a substantially the same thickness as that of the electrode layer is formed a space portion of the electrode layer having a predetermined pattern is formed; and the electrode level difference absorbing print paste as set forth in any one of the above is used as an electrode level difference absorbing print paste for forming the blank pattern layer.

A production method of an electronic device according to a second aspect of the present invention is characterized by comprising the steps of:

forming a stacked body by stacking green sheets and electrode layers having a predetermined pattern; and firing the stacked body;

wherein before forming the stacked body, a blank pattern layer having a substantially the same thickness as that of the electrode layer is formed on a space portion of the electrode layer having a predetermined pattern;

the electrode level difference absorbing print paste for forming the blank pattern layer includes at least ceramic powder and a binder resin; and a polymerization degree of the binder resin included in the electrode level difference absorbing print paste is equal to or higher than that of a binder resin included in slurry for forming the green sheet.

Preferably, ceramic powder included in the electrode level difference absorbing print paste is the same as ceramic powder included in slurry for forming the green sheet. It is because the blank pattern layer is a portion to be integrated with the green sheets after firing.

Preferably, the binder resin included in the electrode level difference absorbing print paste and the binder resin included in slurry for forming the green sheets are the same kind. Due to this, an improvement of adhesiveness between the green sheets and setting of a condition of binder removal processing become easy.

Preferably, the binder resin included in slurry for forming the green sheet includes polyvinyl butyral resin, a polymerization degree of the polyvinyl butyral resin is 1000 or more and 3300 or less, a butyralation degree of the resin is more than 64% and less than 78%, and a residual acetyl group amount is less than 6%.

When the polymerization degree of the polyvinyl butyral resin is too low, it is liable that sufficient mechanical strength as a green sheet is hard to be obtained when made to be a thin layer. Also, when the polymerization degree is too high, surface roughness tends to deteriorate when made to be a sheet. Also, when the butyralation degree of the polyvinyl butyral resin is too low, solubility to the paste tends to decline, while when too high, the sheet surface roughness tends to deteriorate. Furthermore, when a residual acetyl group amount is too much, the sheet surface roughness tends to deteriorate.

BRIEF DESCRIPTION OF DRAWINGS

Below, the present invention will be explained based on embodiments shown in drawings.

BEST MODE FOR CARRYING OUT THE INVENTION

First, as an embodiment of an electronic device according to the present invention, an overall configuration of a multilayer ceramic capacitor will be explained.

Figure 1:
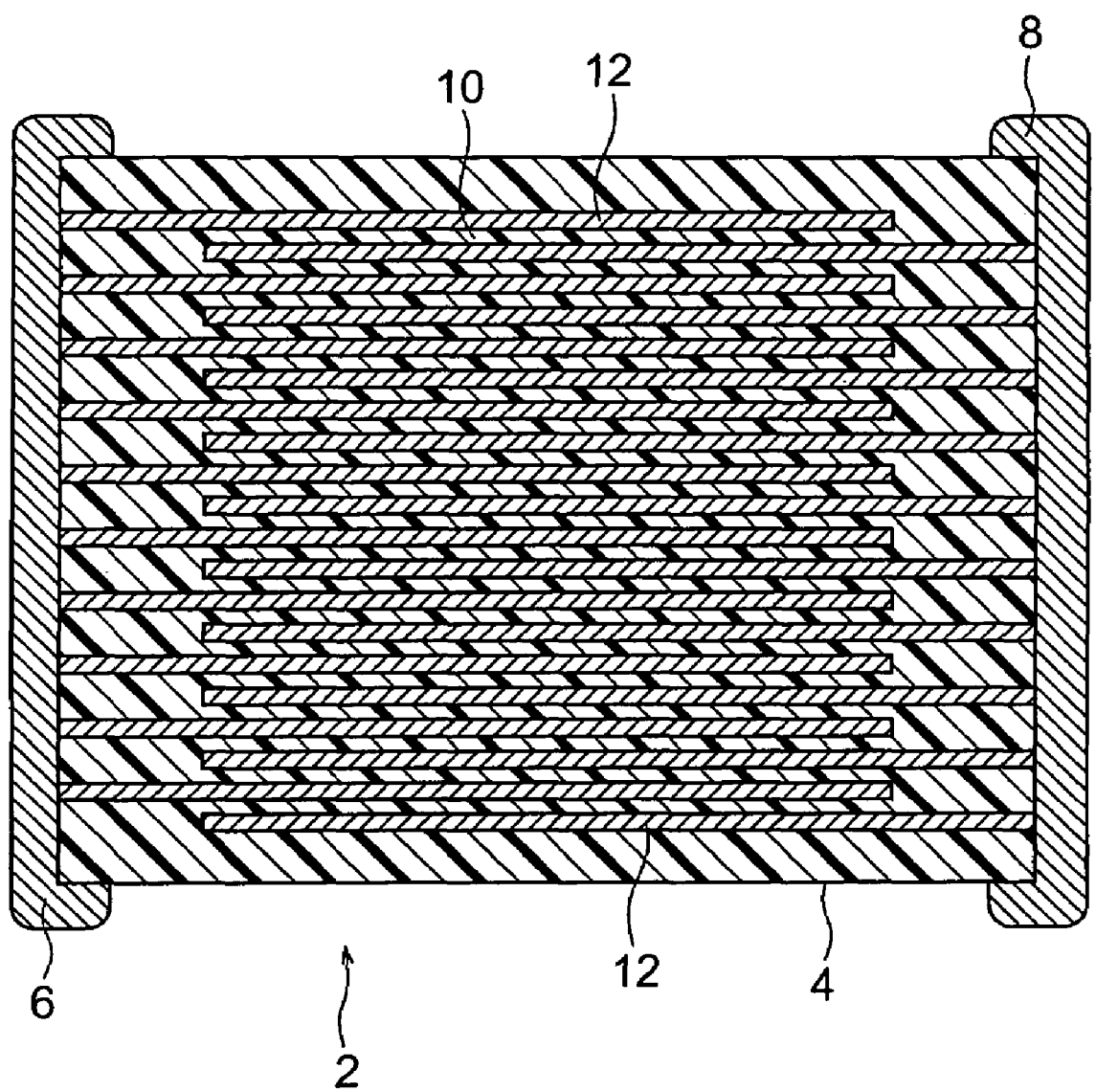
FIG. 1 is a schematic sectional view of a multilayer ceramic capacitor as an embodiment of an electronic device according to the present invention.

As shown in FIG. 1, a multilayer ceramic capacitor 2 according to the present embodiment comprises a capacitor element 4, a first terminal electrode 6 and a second terminal electrode 8. The capacitor element 4 comprises dielectric layers 10 and internal electrode layers 12, and the internal electrode layers 12 are stacked alternately between the dielectric layers 10. The alternately stacked internal electrode layers 12 on one side are electrically connected to inside of the first terminal electrode 6 formed outside of a first end portion of the capacitor element 4. Also, the alternately stacked internal electrode layers 12 on the other side are electrically connected to inside of the second terminal electrode 8 formed outside of a second end portion of the capacitor element 4.

In the present embodiment, an internal electrode layer 12 is formed by transferring an electrode layer 12a to a ceramic green sheet 10a as shown in FIG. 2 to FIG. 6 as will be explained later on.

A material of the dielectric layer 10 is not particularly limited and composed of a dielectric material, for example, calcium titanate, strontium titanate and/or barium titanate, etc. A thickness of each of the dielectric layers 10 is not particularly limited, but those having a thickness of several μm to several hundreds of μm are general. Particularly in the present embodiment, it is made to be thin as preferably 5 μm or less, more preferably 3 μm or less, and more preferably 1.5 μm or less.

A material of the terminal electrodes 6 and 8 is not particularly limited, either, and copper, a copper alloy, nickel and a nickel alloy, etc. are normally used. An alloy of gold and silver with palladium may be also used. A thickness of the terminal electrodes 6 and 8 is not particularly limited, either, but is normally 10 to 50 μm or so.

A shape and size of the multilayer ceramic capacitor 2 may be suitably determined in accordance with the object and use. When the multilayer ceramic capacitor 2 has a rectangular parallelepiped shape, it is normally a length (0.6 to 5.6 mm, preferably 0.6 to 3.2 mm)×width (0.3 to 5.0 mm, preferably 0.3 to 1.6 mm)×thickness (0.1 to 1.9 mm, preferably 0.3 to 1.6 mm) or so.

Next, an example of production methods of the multilayer ceramic capacitor 2 according to the present embodiment will be explained.

(1) First, green sheet slurry is prepared to produce a ceramic green sheet for composing the dielectric layers 10 shown in FIG. 1 after firing.

Green Sheet Slurry

The green sheet slurry is composed of an organic solvent based paste obtained by kneading a dielectric material (ceramic powder) and an organic vehicle.

The dielectric material is suitably selected from a variety of compounds which become composite oxides or oxides, such as carbonates, nitrites, hydroxides, and organic metal compounds, and mixed for use. The dielectric material is normally used as powder having an average particle diameter of 0.4 μm or less, and preferably 0.1 to 3.0 μm or less or so. Note that it is preferable to use finer powder than the green sheet thickness to form an extremely thin green sheet.

The organic vehicle is obtained by dissolving a binder resin in an organic solvent. As the binder resin used for the organic vehicle, a polyvinyl butyral resin is used in the present embodiment. A polymerization degree of the polyvinyl butyral resin is 1000 or higher and 3000 or lower, and preferably 1400 to 1700. Also, a butyralation degree of the resin is 64% or higher and 78% or lower, and preferably 64% or higher and 70% or lower, and the residual acetyl group amount is less than 6% and preferably 3% or less.

The polymerization degree of the polyvinyl butyral resin can be measured, for example, by a polymerization degree of a polyvinyl acetal resin as a material. Also, the butyralation degree can be measured, for example, based on the JISK6728. Furthermore, the residual acetyl group amount can be measured based on the JISK6728.

When the polymerization degree of the polyvinyl butyral resin is too low, it is liable that sufficient mechanical strength is hard to be obtained when made to be a thin film of, for example, 5 μm or less, and preferably 3 μm or less or so. Also, when the polymerization degree is too large, surface roughness tends to decline when made to be a sheet. Also, when the butyralation degree of the polybutyral resin is too low, solubility in the slurry tends to decline, while when too high, sheet surface roughness tends to decline. Furthermore, when the residual acetyl group amount is too large, sheet surface roughness tends to decline. Note that the Japanese Patent application No. 2003-20167 filed prior to the present invention discloses examples showing it is preferable for a green sheet slurry that the polymerization degree, butyralation degree and residual acetyl group amount of the polyvinyl butyral resin are in the above rages.

An organic solvent to be used for an organic vehicle is not particularly limited and an organic solvent, such as terpineol, alcohol, butyl carbitol, acetone and toluene, is used. In the present embodiment, the organic solvent preferably contains an alcohol based solvent and an aromatic solvent, and the aromatic solvent is contained by 10 parts by weight or more and 20 parts by weight or less when assuming total weight of the alcohol based solvent and aromatic solvent is 100 parts by weight. When a content of the aromatic solvent is too small, sheet surface roughness tends to increase, while when too large, the paste filtration properties decline and sheet surface roughness also declines by increasing.

As an alcohol based solvent, methanol, ethanol, propanol and butanol, etc. may be mentioned. As an aromatic solvent, toluene, xylene and benzyl acetate, etc. may be mentioned.

It is preferable that a binder resin is dissolved in an alcohol based solvent of at least one kind of methanol, ethanol, propanol and butanol and filtered to be a solution in advance, and dielectric powder and other components are added to the solution. A binder resin having a high polymerization degree is hard to be dissolved in a solvent, and dispersibility of the slurry tends to decline in a normal method. In a method of the present embodiment, a binder resin having a high polymerization degree is dissolved in the above good solvent and ceramic powder and other components are added to the solution, so that dispersibility of the slurry can be improved and generation of undissolved resin can be suppressed. Note that solid content concentration cannot be raised and changes of lacquer viscosity tend to become large over time in the case of a solvent other than the above solvents.

In the green sheet slurry, additives selected from a variety of dispersants, plasticizers, antistatic agents, dielectrics, glass flit, and insulators may be included in accordance with need.

Figure 3A:
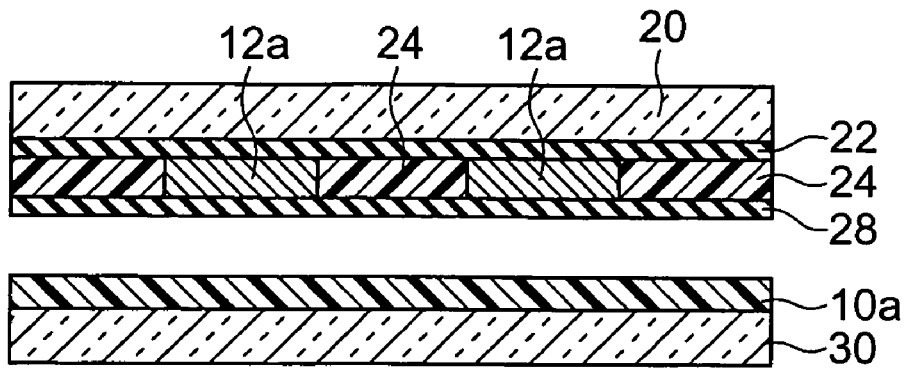

By using the green sheet slurry, for example as shown in FIG. 3A, a green sheet 10a is formed to be a thickness of preferably 0.5 to 30 μm, and more preferably 0.5 to 10 μm or so on a carrier sheet 30 as a second supporting sheet by the doctor blade method, etc. The green sheet 10a is dried after being formed on the carrier sheet 30. The temperature for drying the green sheet 10a is preferably 50 to 100° C. and the drying time is preferably 1 to 20 minutes. A thickness of the green sheet 10a after drying is contracted to 5 to 25% comparing with that before drying. The thickness of the green sheet after drying is preferably 3 μm or less.

Figure 2A:
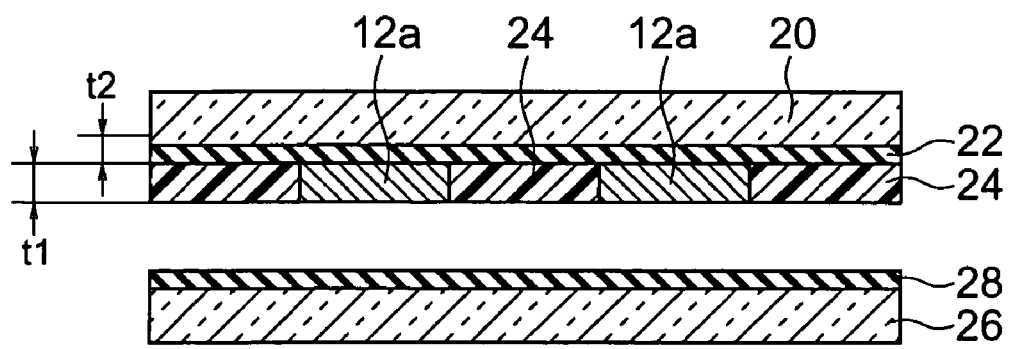
FIG. 2A to FIG. 2C and FIG. 3A to FIG. 3C are sectional views of a key part showing a transfer method of an electrode layer.

(2) As shown in FIG. 2A, a carrier sheet 20 as a first supporting sheet is prepared separately from the above carrier sheet 30, and a release layer 22 is formed thereon. Furthermore, on top thereof, an electrode layer 12a having a predetermined pattern is formed. On a surface of the release layer 22 where the electrode layer 12a is not formed, a blank pattern layer 24 having substantially the same thickness as that of the electrode layer 12a is formed.

As the carrier sheets 20 and 30, for example, a PET film, etc. is used, and those coated with silicon, etc. are preferable to improve the release property. Thicknesses of the carrier sheets 20 and 30 are not particularly limited and are preferably 5 to 100 μm. The thicknesses of the carrier sheets 20 and 30 may be same or different.

Release Layer

The release layer 22 preferably contains the same dielectric powder as the dielectric composing the green sheet 10a shown in FIG. 3A. Also, the release layer 22 contains a binder, a plasticizer and a release agent other than the dielectric powder. A particle diameter of the dielectric powder may be the same as that of the dielectric particles included in the green sheet but it is preferable to be smaller.

In the present embodiment, a thickness t2 of the release layer 22 is preferably not more than a thickness of the electrode layer 12a, and more preferably, it is set to be a thickness of 60% or less, and further preferably 30% or less.

A method of applying the release layer 22 is not particularly limited, but it has to be formed to be extremely thin, so that an applying method using, for example, a wire bar coater or a die coater is preferable. Note that adjustment of the release layer thickness can be made by selecting a wire bar coater having a different wire diameter. Namely, to make the thickness of the release layer to be applied thinner, it can be done by selecting one having a small wire diameter, inversely, to form it thick, one with a large wire diameter may be selected. The release layer 22 is dried after being applied. The drying temperature is preferably 50 to 100° C. and the drying time is preferably 1 to 10 minutes.

A binder for the release layer 22 is composed, for example, of an acrylic resin, polyvinyl butyral, polyvinyl acetal, polyvinyl alcohol, polyolefin, polyurethane, polystyrene, or an organic composed of a copolymer of these or emulsion. The binder contained in the release layer 22 may be the same as the binder contained in the green sheet 10a or may be different from that, but preferably the same.

A plasticizer for the release layer 22 is not particularly limited and, for example, phthalate ester, dioctyl phthalate, adipic acid, phosphate ester and glycols, etc. may be mentioned. The plasticizer to be contained in the release layer 22 may be the same as that contained in the green sheet 10a or may be different from that.

A release agent for the release layer 22 is not particularly limited and, for example, paraffin, wax and silicone oil, etc. may be mentioned. A release agent contained in the release layer 22 may be the same as that contained in the green sheet 10a or may be different from that.

A binder is contained in the release layer 22 by preferably 2.5 to 200 parts by weight, more preferably 5 to 30 parts by weight, and particularly preferably 8 to 30 parts by weight or so with respect to 100 parts by weight of dielectric particle.

A plasticizer is preferably contained in the release layer 22 by 0 to 200 parts by weight, preferably 20 to 200 parts by weight, and more preferably 50 to 100 parts by weight with respect to 100 parts by weight of the binder.

A release agent is preferably contained in the release layer 22 by 0 to 100 parts by weight, preferably 2 to 50 parts by weight, and more preferably 5 to 20 parts by weight with respect to 100 parts by weight of the binder.

Electrode Layer

After forming the release layer 22 on the surface of the carrier sheet 30, as shown in FIG. 2A, an electrode layer 12a to compose an internal electrode layer 12 after firing is formed to be a predetermined pattern on the surface of the release layer 22. A thickness of the electrode layer 12a is preferably 0.1 to 2 μm, and more preferably 0.1 to 1.0 μm or so. The electrode layer 12a may be configured by a single layer or two or more layers having different compositions.

The electrode layer 12a can be formed on the surface of the release layer 22 by a thick film formation method, such as a printing method using an electrode paste, or a thin film method, such as evaporation and sputtering. When forming the electrode layer 12a on the surface of the release layer 22 by a screen printing method or a gravure printing method as a kind of thick film method, it is as follows.

First, an electrode paste is prepared. The electrode paste is fabricated by kneading a conductive material composed of a variety of conductive metals and alloys, or a variety of oxides, organic metal compounds or resinates, etc. to be conductive materials after firing with an organic vehicle.

As a conductive material to be used when producing the electrode paste, Ni, a Ni alloy and a mixture of these are used. A shape of the conductive materials is not particularly limited and may be a spherical shape and scale-like shape, etc. or a mixture of these shapes. Those having an average particle diameter of the conductive material of normally 0.1 to 2 µm, and preferably 0.2 to 1 µm or so may be used.

An organic vehicle contains a binder and a solvent. As the binder, for example, ethyl cellulose, an acrylic resin, polyvinyl butyral, polyvinyl acetal, polyvinyl alcohol, polyolefin, polyurethane, polystyrene, or a copolymer of these may be mentioned. Particularly, butyrals, such as polyvinyl butyral, are preferable.

The binder is contained in the electrode paste by preferably 2 to 10 parts by weight with respect to 100 parts by weight of the conductive material (metal powder). As a solvent, any of well-known ones, such as terpineol, butylcarbitol and kerosene, may be used. A content of the solvent is preferably 20 to 55 wt % or so with respect to the entire paste.

To improve the adhesiveness, the electrode paste preferably contains a plasticizer. As a plasticizer, benzylbutyl phthalate (BBP) and other phthalate esters, adipic acids, phosphoric esters, and glycols, etc. may be mentioned. The plasticizer in the electrode paste is preferably 10 to 300 parts by weight, and more preferably 10 to 200 parts by weight with respect to 100 parts by weight of the binder. Note that when an adding quantity of the plasticizer or adhesive is too large, it is liable that strength of the electrode layer 12a remarkably declines. Also, to improve transferability of the electrode layer 12a, it is preferable to improve adhesiveness and/or adherence of the electrode paste by adding a plasticizer and/or adhesive in the electrode paste.

Blank Pattern Layer

After or before forming an electrode paste layer in a predetermined pattern on a surface of the release layer 22 by the printing method, a blank pattern layer 24 having substantially the same thickness as that of the electrode layer 12a is formed on the surface of the release layer 22 not formed with the electrode layer 12a.

The blank pattern layer 24 shown in FIG. 2A can be formed on the surface of the release layer 22 by a thick film formation method, such as a printing method using an electrode level difference absorbing print paste. When forming the blank pattern layer (FIG. 2A) on the surface of the release layer 22 by a screen method as one of the thick film formation methods, it is as below.

First, an electrode level difference absorbing print paste is prepared. The electrode level difference absorbing print paste is composed of an organic solvent based paste obtained by kneading a dielectric material (ceramic powder) and an organic vehicle.

A dielectric material to be used when producing the electrode level difference absorbing print paste is produced by using the same dielectric particles as that in the dielectric composing the green sheet 10a and dielectric having the same average particle diameter. The electrode level difference absorbing print paste contains 30 to 55 parts by weight, and more preferably 40 to 50 parts by weight of dielectric particles (ceramic powder) with respect to the entire paste. When a containing ratio of the ceramic powder is too small, the paste viscosity becomes small and printing becomes difficult. While, when the containing ratio of the ceramic powder is too large, it is liable that the printing thickness becomes hard to be made thin.

The organic vehicle contains a binder and a solvent. As the binder, for example, ethyl cellulose, an acrylic resin, polyvinyl butyral, polyvinyl acetal, polyvinyl alcohol, polyolefin, or a copolymer of these may be mentioned. Particularly, butyrals, such as polyvinyl butyral, are preferable.

The polymerization degree of the butyral based binder contained in the electrode level difference absorbing print paste is made to be equal to, preferably higher than that of a binder contained in slurry for forming the green sheet 10a. For example, when the polymerization degree of polyvinyl butyral as a binder contained in the green sheet slurry is polyvinyl butyral or polyvinyl acetal having a polymerization degree of 1000 to 1700, a binder contained in the electrode level difference absorbing print paste is 1400 or more, more preferably 1700 or more, and particularly preferable 2400 or more. Among them, polyvinyl acetal having a polymerization degree of 2000 or more is preferable.

When the binder of the electrode level difference absorbing print paste is polyvinyl butyral, the butyralation degree thereof is preferably in a range of 64 to 74 mol %. Also, in the case of polyvinyl acetal, the acetalization degree is preferably 66 to 74 mol %.

The binder is contained preferably by 3 to 9 parts by weight with respect to 100 parts by weight of a dielectric material in the electrode level difference absorbing print paste. More preferably, it is contained by 4 to 8 parts by weight.

As the solvent, for example, terpineol, dihydroterpineol, terpinyl acetate, dihydroterpinyl acetate, and 4-(1' acetoxy-1')cyclohexanol acetate are preferably used. The solvent content is preferably 20 to 80 parts by weight, and more preferably 50 to 70 parts by weight with respect to the entire paste.

Also, the electrode level difference absorbing print paste may contain a variety of additives, such as dispersants, plasticizers, adhesives and antistatic agents.

As a dispersant, it is not particularly limited and, for example, ester based polymers, carboxylic acids and other polymer materials are used, and the content is preferably 0.25 to 1.5 parts by weight, and more preferably 0.5 to 1.0 part by weight with respect to 100 parts by weight of ceramic powder.

As a plasticizer, while not particularly limited, benzylbutyl phthalate (BBP) and other phthalate esters, adipic acids, phosphoric esters, and glycols, etc. may be mentioned. The content is preferably 10 to 200 parts by weight, more preferably, 20 to 150 parts by weight, and more preferably 30 to 100 parts, especially 50 to 100 parts by weight with respect to 100 parts by weight of the binder.

As an antistatic agent, it is not particularly limited but, for example, imidazoline based antistatic agent, etc. are used, and the content is preferably 0.1 to 0.75 part by weight, and more preferably 0.25 to 0.5 part by weight with respect to 100 parts by weight of the ceramic powder.

Viscosity of the electrode level difference absorbing print paste is preferably 4 to 30 Pa·s, and more preferably 7 to 15 Pa·s when being given rotation of obtaining a shear rate of 8[1/s]. When the paste viscosity becomes less than 4 Pa·s, it is liable to cause a trouble that the paste flows out from a mesh of a printing plate making, and when 30 Pa·s or more, it is liable that the leveling declines and a surface shape of the applied film becomes remarkably deteriorated.

The electrode level difference absorbing print paste is printed on a blank pattern portion between electrode layers 12a as shown in FIG. 2A. After that, the electrode layer 12a and the blank pattern layer 24 are dried in accordance with need. The drying temperature is not particularly limited, but is preferably 70 to 120° C., and the drying time is preferably 1 to 10 minutes.

(3) As shown in FIG. 2A, an adhesive layer transfer sheet formed with an adhesive layer 28 is prepared on the surface of a carrier sheet 26 as a third supporting sheet separately from the carrier sheets 20 and 30 explained above. The carrier sheet 26 is formed by the same sheet as that of the carrier sheets 20 and 30.

Adhesive Layer

A composition of the adhesive layer 28 is the same as that of the release layer 22 except for not containing a release agent. Namely, the adhesive layer 28 contains a binder, a plasticizer and a release agent. The adhesive layer 28 may contain the same dielectric particle as that of the dielectrics composing the green sheet 10a, however, in the case of forming an adhesive layer having a thinner thickness than a particle diameter of the dielectric particles, it is better not to contain dielectric particles. Also, when dielectric particles are contained in the adhesive layer 28, a particle diameter of the dielectric particles is preferably smaller than the particle diameter of the dielectric particles contained in the green sheet.

A plasticizer is preferably contained in the adhesive layer 28 by 0 to 200 parts by weight, preferably 20 to 200 parts by weight, and more preferably 50 to 100 parts by weight with respect to 100 parts by weight of the binder.

The adhesive layer 28 further contains an antistatic agent, and the antistatic agent includes one of imidazoline based surfactants, and weight based adding quantity of the antistatic agent is preferably not more than that of the binder (organic polymer material). Namely, the antistatic agent is preferably contained in the adhesive layer 28 by 0 to 200 parts by weight, preferably 20 to 200 parts by weight, and more preferably 50 to 100 parts by weight with respect to 100 parts by weight of the binder.

A thickness of the adhesive layer 28 is preferably 0.02 to 0.3 μm or so, more preferably, thinner than an average particle diameter of dielectric particles contained in the green sheet. Also, a thickness of the adhesive layer 28 is preferably ⅒ or less of a thickness of the green sheet 10a.

When a thickness of the adhesive layer 28 is too thin, the adhesive force declines, while when too thick, a space is easily formed inside an element body after sintering depending on the thickness of the adhesive layer, and a capacitance by an amount of the volume tends to decrease remarkably.

The adhesive layer 28 is formed on the surface of the carrier sheet 26 as a third supporting sheet, for example, by a bar coater method, die coater method, reverse coater method, dip coater method and kiss coater method, etc. and dried in accordance with need. The drying temperature is not particularly limited, but is preferably the room temperature to 80° C., and the drying time is preferably 1 to 5 minutes.

Figure 2B:
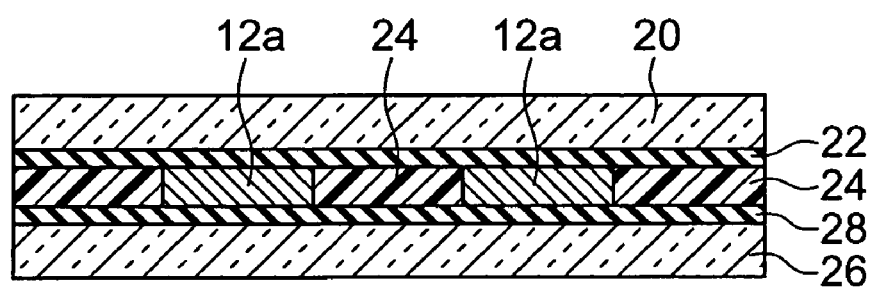
Figure 2C:
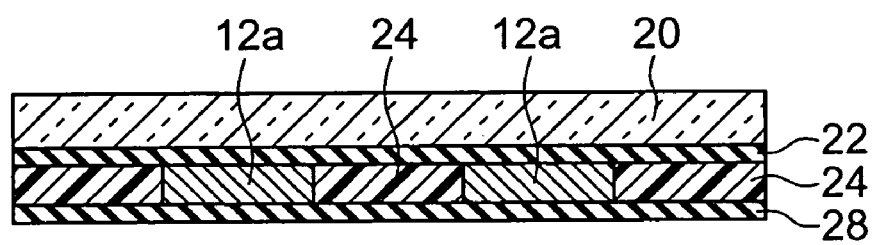

(4) To form the adhesive layer on the surface of the electrode layer 12a and the blank pattern layer 24 shown in FIG. 2A, a transfer method is applied in the present embodiment. Namely, as shown in FIG. 2B, the adhesive layer 28 of the carrier sheet 26 is pressed against the surface of the electrode layer 12a and the blank pattern layer 24, heated and pressed, then, the carrier sheet 26 is removed. Consequently, as shown in FIG. 2C, the adhesive layer 28 is transferred to the surface of the electrode layer 12a and the blank pattern layer 24. Note that transfer of the adhesive layer 28 may be performed on the surface of the green sheet 10a shown in FIG. 3A.

The heating temperature at transferring is preferably 40 to 100° C., and the pressing force is preferably 0.2 to 15 MPa. Pressing may be performed by a press or a calendar roll, but is preferably performed by a pair of rolls.

Figure 3B:
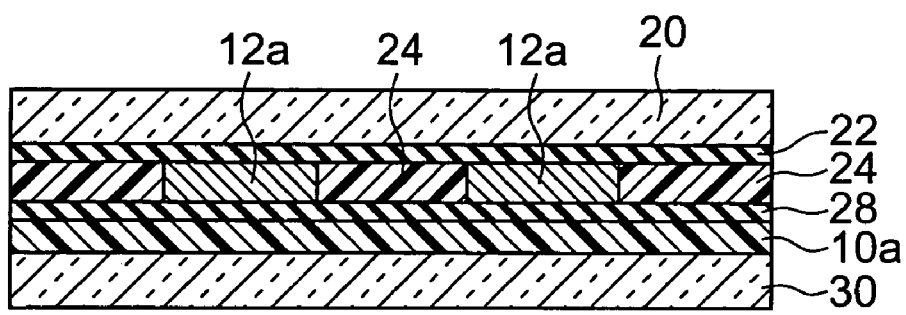
Figure 3C:
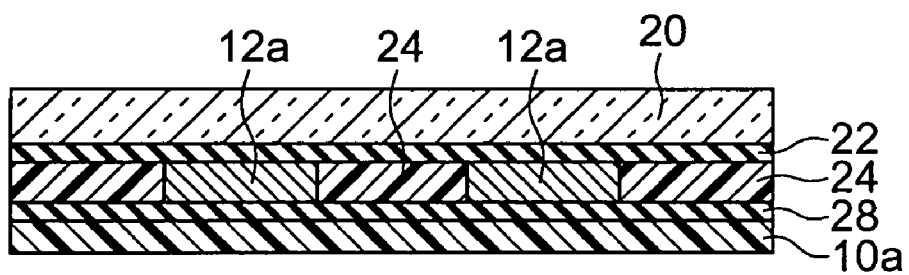

After that, the electrode layer 12a is adhered to the surface of the green sheet 10a formed on the surface of the carrier sheet 30 shown in FIG. 3A. For that purpose, as shown in FIG. 3B, the electrode layer 12a and the blank pattern layer 24 of the carrier sheet 20 are pressed via the adhesive layer 28 against the surface of the green sheet 10a together with the carrier sheet 20, heated and pressed, consequently, as shown in FIG. 3C, the electrode layer 12a and the blank pattern layer 24 are transferred to the surface of the green sheet 10a. Note that since the carrier sheet 30 on the green sheet side is peeled off, when seeing from the green sheet 10a side, the green sheet 10a is transferred to the electrode layer 12a and the blank pattern layer 24 via the adhesive layer 28.

Heating and pressing at the time of transferring may be pressing and heating by a press or by a calendar roll, but is preferably performed by a pair of rolls. The heating temperature and the pressing force are same as those at the time of transferring the adhesive layer 28.

A single-layer electrode layer 12a in a predetermined pattern is formed on the single green sheet 10a by steps shown in FIG. 2A to FIG. 3C. A green sheet 10a formed with the electrode layer 12a is stacked by repeating the steps shown in FIG. 4A to FIG. 6C. Note that the same reference numbers in FIG. 4A to 6C are given to common members with those shown in FIG. 3A to FIG. 4C, and an explanation thereon is partially omitted.

Figure 4A:
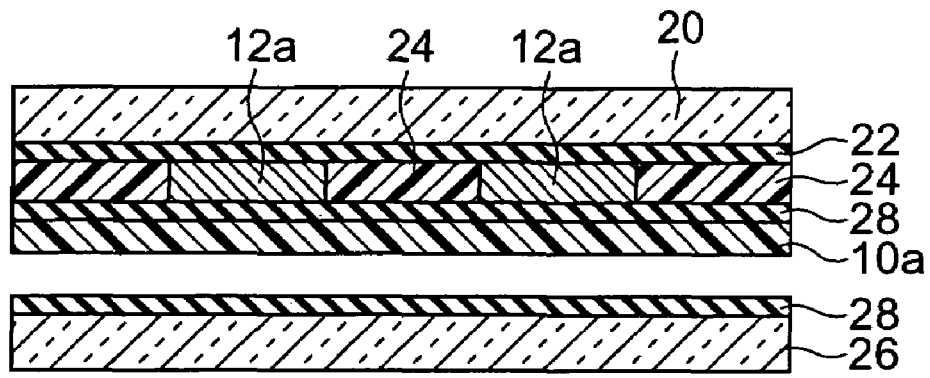
FIG. 4A to FIG. 4C, FIG. 5A to FIG. 5C, FIG. 6A to FIG. 6C, FIG. 7 and FIG. 8 are sectional views of a key part showing a stacking method of a green sheet on which an electrode layer is adhered.
Figure 4B:
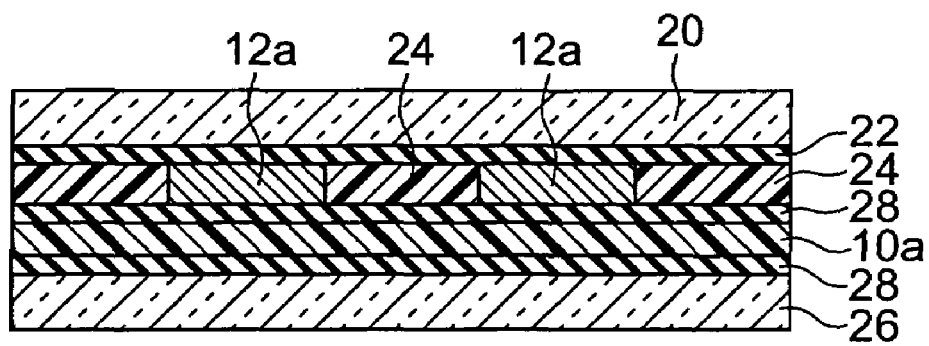
Figure 4C:
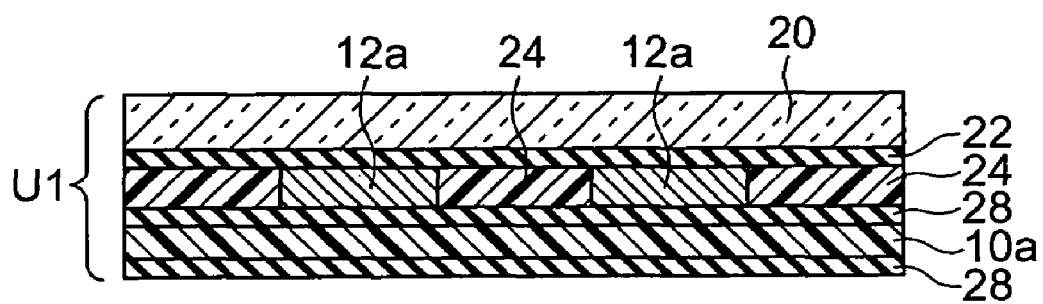
Figure 5A:
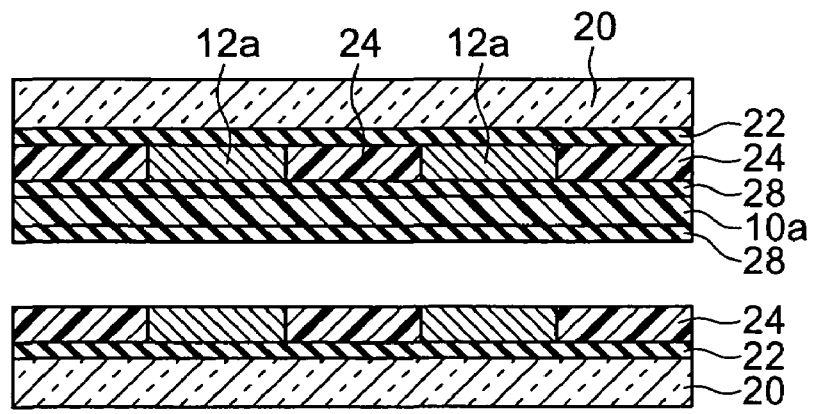

First, as shown in FIG. 4A to FIG. 4C, the adhesive layer 28 is transferred to the surface on the other side of the electrode layer (back side) on the green sheet 10a. After that, as shown in FIG. 5A to FIG. 5C, the electrode layer 12a and the blank pattern layer 24 are transferred to the back side of the green sheet 10a via the adhesive layer 28.

Formation of Stacked Body

Figure 6A:
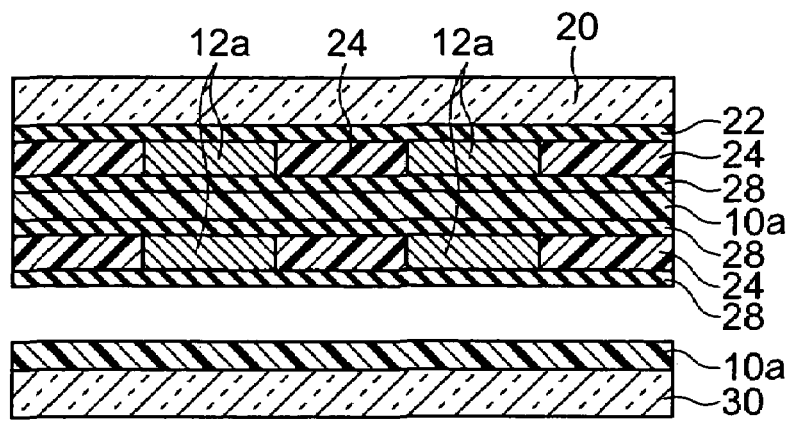
Figure 6B:
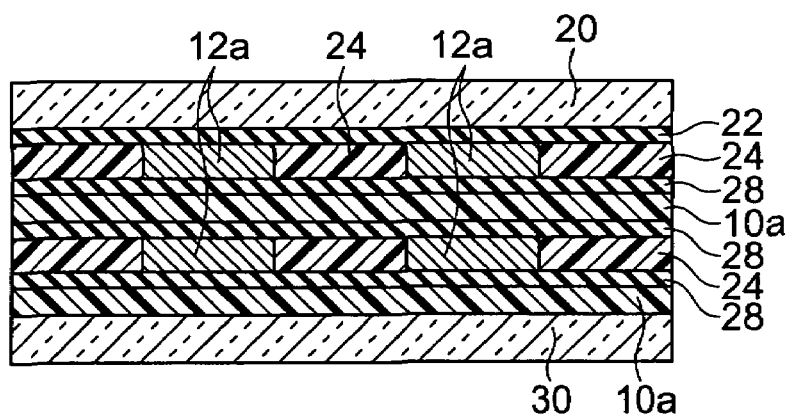
Figure 6C:
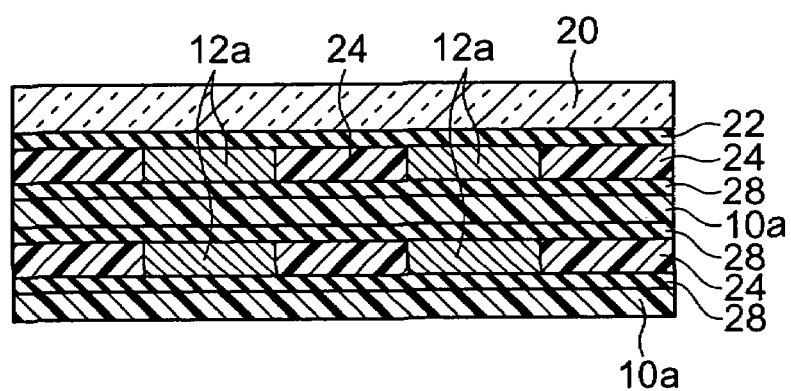
Figure 7:
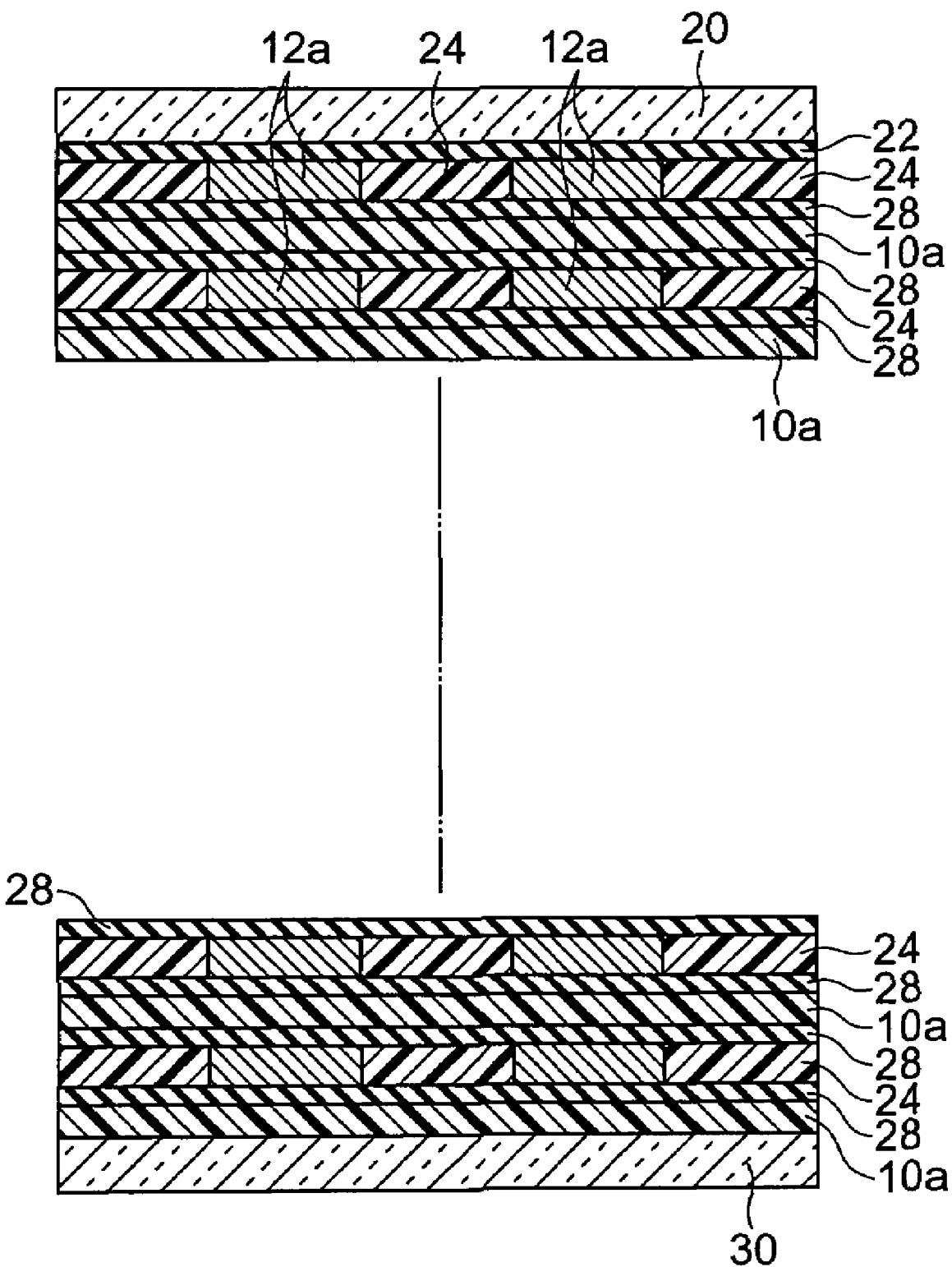

Next, as shown in FIG. 6A to FIG. 6C, on the surface of the electrode layer 12a and the blank pattern layer 24, the green sheet 10a is transferred via the adhesive layer 28. After that, by repeating the transfer, a multilayer block, wherein a large number of electrode layers 12a and the green sheet 10a are alternately stacked as shown in FIG. 7, is obtained.

Figure 5B:
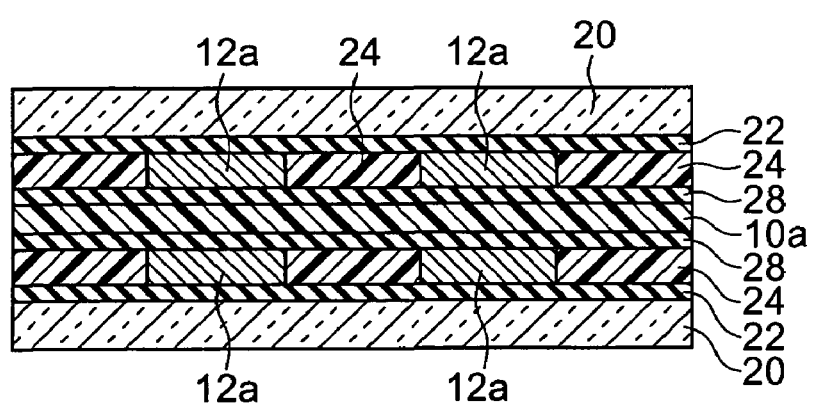
Figure 5C:
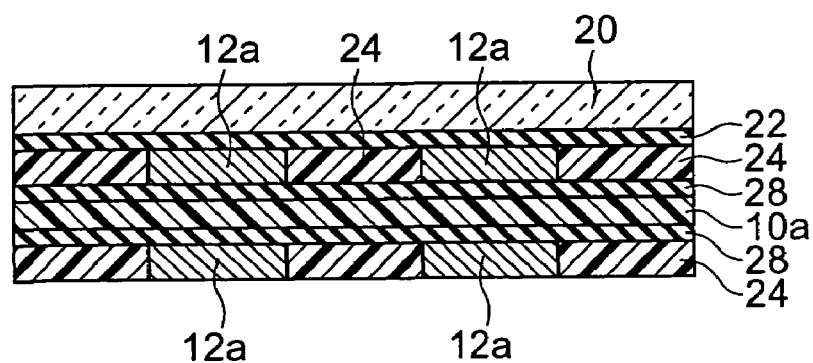

Note that without applying the steps shown in FIG. 5C to FIG. 6C, from the step shown in FIG. 5B, not removing the carrier sheet 20 on the lower side, but the carrier sheet on the upper side may be removed, and a multilayer unit U1 shown in FIG. 4C may be stacked thereon. After that, by repeating an operation of removing the carrier sheet 20 on the upper side again, stacking thereon the multilayer unit U1 shown in FIG. 4C, and removing the carrier sheet 20 on the upper side, a multilayer block wherein a large number of electrode layers 12a and the green sheet 10a are alternately stacked as shown in FIG. 7 is obtained. A method of stacking the multilayer unit U1 shown in FIG. 4C is superior in terms of an efficiency of the stacking operation.

When the number of stacking layers of the green sheet is small, a firing step in the next step is performed by the multilayer block alone. Also, in accordance with need, a plurality of multilayer blocks as such may be stacked via adhesive layers 28 formed by a transfer method in the same way as above to obtain a multilayer body having larger number of layers.

Figure 8:
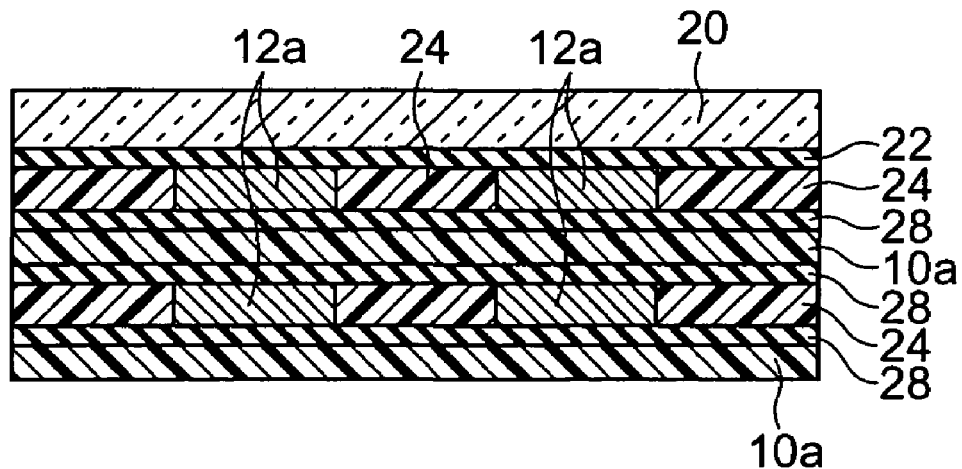
Figure 8:
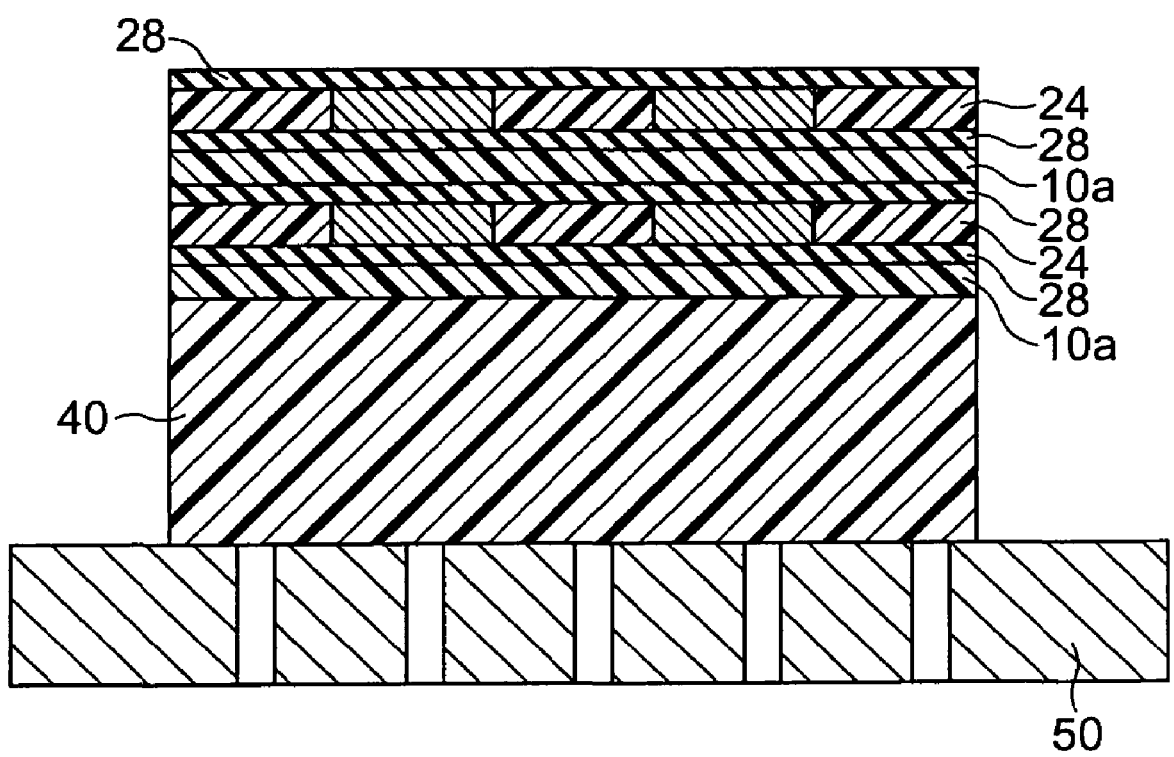

(5) After that, as shown in FIG. 8, a green sheet 40 for an outer layer (a thick multilayer body obtained by stacking a plurality of green sheets not formed with an electrode layer) is stacked on the lower surface of the stacked body and the entire stacked body is supported by an absorption holder 50. After that, the carrier sheet 20 on the upper side is peeled off, the green sheet 40 for an outer layer is formed on top of the multilayer body in the same way, and final pressing is performed.

Pressure at the time of the final pressing is preferably 10 to 200 MPa. Also, the heating temperature is preferably 40 to 100° C. After that, the multilayer body is cut to be a predetermined size to form green chips. The green chips are subjected to binder removal processing and firing processing, then, thermal treatment is performed in order to re-oxidize the dielectric layer.

Binder Removal and Firing

The binder removal processing may be performed under a normal condition, but when using a base metal, such as Ni and a Ni alloy, as a conductive material of the internal electrode layer, it is preferably performed under the specific condition below.

temperature rising rate: 5 to 300° C./hour, particularly 10 to 50° C./hour holding temperature: 200 to 400° C., particularly 250 to 350° C.

holding time: 0.5 to 20 hours, particularly 1 to 10 hours atmosphere: a mixed gas of wet $N_2$ and $H_2$ A firing condition is preferably as below.

temperature rising rate: 50 to 500° C./hour, particularly 200 to 300° C./hour holding temperature: 1100 to 1300° C., particularly 1150 to 1250° C.

holding time: 0.5 to 8 hours, particularly 1 to 3 hours cooling rate: 50 to 500° C./hour, particularly 200 to 300° C./hour atmosphere gas: a mixed gas of wet $N_2$ and $H_2$, etc.

Note that oxygen partial pressure in an atmosphere in the air at firing is preferably $10^{-2}$ Pa or less, particularly $10^{-2}$ to $10^{-8}$ Pa. When exceeding the above ranges, the internal electrode layer tends to oxidize, while when the oxygen partial pressure is too low, abnormal sintering is caused in an electrode material of the internal electrode layer to be broken.

The thermal treatment after performing such firing is preferably performed with a holding temperature or highest temperature of 1000° C. or higher, more preferably 1000 to 1100° C. When the holding temperature or the highest temperature at the time of the thermal treatment is lower than the above ranges, it is liable that oxidization of the dielectric material is insufficient to make the insulation resistance lifetime short, while when exceeding the above ranges, Ni in the internal electrode oxidizes and the capacity decreases, moreover, Ni reacts with a dielectric base and the lifetime also tends to become short. The oxygen partial pressure at the time of thermal treatment is higher than a higher oxygen partial pressure than a reducing atmosphere at the time of firing, preferably $10^{-3}$ Pa to 1 Pa, and more preferably $10^{-2}$ Pa to 1 Pa. When it is lower than the above range, re-oxidization of the dielectric layer 2 becomes difficult, while when exceeding the above ranges, the internal electrode layer 3 tends to oxidize.

Other condition of the thermal treatment is preferably as below.

holding time: 0 to 6 hours, particularly 2 to 5 hours cooling rate: 50 to 500° C./hour, particularly 100 to 300° C./hour atmosphere gas: wet $N_2$ gas, etc.

Note that to wet a $N_2$ gas or a mixed gas, etc., for example, a wetter, etc. may be used. In this case, the water temperature is preferably 0 to 75° C. or so. Also, the binder removal processing, firing and thermal treatment may be performed continuously or separately. When performing continuously, the atmosphere is changed without cooling after the binder removal processing, continuously, the temperature is raised to the holding temperature at firing to perform firing. Next, it is cooled and the thermal treatment is preferably performed by changing the atmosphere when the temperature reaches to the holding temperature of the thermal treatment. On the other hand, when performing them separately, after raising the temperature to the holding temperature at the binder removal processing in an atmosphere of a $N_2$ gas or a wet $N_2$ gas, the atmosphere is changed, and the temperature is furthermore raised. After cooling the temperature to the holding temperature at the thermal treatment, it is preferable that the cooling continues by changing the atmosphere again to a $N_2$ gas or a wet $N_2$ gas. Also, in the thermal treatment, after raising the temperature to the holding temperature under the $N_2$ gas atmosphere, the atmosphere may be changed, or the entire process of the thermal processing may be in a wet $N_2$ gas atmosphere.

The thus obtained sintered body (element body 4) is subjected to end surface polishing, for example, by barrel polishing and sand-blast, etc., then, a terminal electrode paste is burnt to form terminal electrodes 6 and 8. For example, a firing condition of the terminal electrode paste is preferably in a mixed gas of wet $N_2$ and $H_2$ at 600 to 800° C. for 10 minutes to 1 hour or so. In accordance with need, soldering, etc. is performed on the terminal electrodes 6 and 8 to form a pad layer. Note that the terminal electrode paste may be fabricated in the same way as the electrode paste explained above.

A multilayer ceramic capacitor of the present invention produced as above is mounted on a print substrate, etc. by soldering, etc. and used for a variety of electronic equipments.

In a method of producing a multilayer ceramic capacitor according to the present embodiment, as a green sheet, a polyvinyl acetal resin having a polymerization degree in a specific range, a butyralation degree in a specific range and a residual acetyl group amount of a predetermined value or less is used as a binder. Therefore, even an extremely thin green sheet 10a of, for example, 5 μm or less is strong enough to be peeled from the carrier sheet 30 and has preferable adhesiveness and handlability. Also, surface roughness of the sheet 10a is small and stackability is excellent. Therefore, it becomes easy to stack a large number of green sheets 10a via electrode layers 12a, and it is also possible to stack without the adhesive layers 28 in accordance with need.

In the present embodiment, when forming a blank pattern layer 24 on a blank pattern portion of the electrode layer 12a shown in FIG. 2A, viscosity of the electrode level difference absorbing print paste is not extremely declined and preferable printing becomes possible even in the case of an extremely thin blank pattern layer. Also, since it is not necessary to increase a binder resin amount included in the electrode level difference absorbing print paste, there is a low possibility that delamination between sheets, etc. arise at the time of binder removal of a stacked body.

Note that the present invention is not limited to the above embodiments and may be variously modified within the scope of the present invention.

For example, a method of the present invention is not limited to a production method of a multilayer ceramic capacitor and may be applied as a production method of other multilayer electronic devices.

EXAMPLES

Below, the present invention will be explained based on further detailed examples, but the present invention is not limited to the examples.

Example 1

Production of Green Sheet Paste

As a starting material of ceramic powder, $BaTiO_3$ powder (BT-02 made by Sakai Chemical Industry Co., Ltd.) was used. A ceramic powder subcomponent additives were prepared to satisfy $(Ba_{0.6}Ca_{0.4})SiO_3$: 1.48 parts by weight, $Y_2O_3$: 1.01 parts by weight, $MgCO_3$: 0.72 wt %, $Cr_2O_3$: 0.13 wt % and $V_2O_5$: 0.045 wt % with respect to 100 parts by weight of the $BaTiO_3$ powder.

First, only the subcomponents were mixed by a ball-mill to obtain slurry. Namely, the subcomponent additives (total amount 8.8 g) and a solvent (16 g), wherein ethanol/n-propanol is 1:1, were preliminary ground by a ball-mill for 20 hours. Next, the preliminary ground slurry of the subcomponent additives, ethanol: 38 g, n-propanol: 38 g, xylene: 28 g, mineral spirit: 14 g, DOP (dioctyl phthalate) as a plasticizer component: 6 g and a polyethylene glycol based nonionic dispersant (HLB=5 to 6) as a dispersant: 1.4 g were added to $BaTiO_3$: 191.2 g and mixed by a ball-mill for 4 hours. Note that a block polymer of polyethylene glycol and fatty ester was used as the polyethylene glycol based nonionic dispersant (HLB=5 to 6) as a dispersant.

Next, as a binder resin, the dispersion slurry was added with 15% lacquer (BH6 made by Sekisui Chemical Co., Ltd. was dissolved in ethanol/n-propanol=1:1) of BH6 (polyvinyl butyral resin: PVB) made by Sekisui Chemical Co., Ltd. by 6 wt % as a solid content (80 g as a lacquer adding quantity). After that, by ball-milling for 16 hours, ceramic slurry (green sheet slurry) was obtained.

A polymerization degree of a polyvinyl butyral resin as the binder resin was 1400, a butyralation degree thereof was 69%±3%, and a residual acetyl group amount thereof was 3±2%. The binder resin was contained by 6 parts by weight in the ceramic slurry with respect to 100 parts by weight of ceramic powder (including ceramic powder subcomponent additives). Also, when assuming that total volume of the ceramic powder, binder resin and plasticizer in the ceramic slurry was 100 volume %, the volume ratio accounted by the ceramics powder was 67.31 volume %. The weight ratio of the ceramic powder in the entire slurry was 49 wt %.

Also, DOP as a plasticizer was contained in the ceramic slurry by 50 parts by weight with respect to 100 parts by weight of the binder resin. Water was contained by 2 parts by weight with respect to 100 parts by weight of the ceramic powder. The polyethylene glycol based nonionic dispersant as a dispersant was contained by 0.7 part by weight with respect to 100 parts by weight of the ceramic powder.

Also, in the slurry, mineral spirit of at least any one of a hydrocarbon based solvent, industrial gasoline, kerosene and solvent naphtha was added by 5 parts by weight with respect to 100 parts by weight of the ceramic powder. Furthermore, the slurry contains an alcohol based solvent and an aromatic solvent as a solvent. When assuming that total weight of the alcohol based solvent and aromatic solvent was 100 parts by weight, toluene as an aromatic solvent was contained by 15 parts by weight.

Production of Green Sheet

The slurry obtained as above was applied to a PET film as a supporting film shown in FIG. 3A to be a thickness of 1.2 μm by a wire bar coater and dried to produce a green sheet 10a. The applying rate was 50 m/min. and the drying condition was a temperature in the drying furnace of 60° C. to 70° C. and drying time of 2 minutes.

Release Layer Slurry

Other than changing $BaTiO_3$ to BT-01 in the green sheet slurry explained above, slurry was produced in the same way as the green sheet slurry, and the slurry was diluted by five times by a-mixed solvent of ethanol: propanol:xylene (42.5: 42.5:15) to obtain release layer slurry.

Adhesive Layer Slurry

As adhesive layer slurry, an organic vehicle was used. Specifically, with respect to 100 parts by weight of a polyvinyl butyral resin, a mixed solution of 50 parts by weight of bis(2 hethylhexyl) phthalate DOP as a plasticizer and 900 parts by weight of MEK was diluted by ten times furthermore by MEK to obtain adhesive layer slurry.

Internal Electrode Paste (Electrode Layer Paste to be Transferred)

With respect to 100 parts by weight of Ni particles having an average particle diameter of 0.2 μm, $BaTiO_3$ powder (BT-01 made by Sakai Chemical Industry Co., Ltd.): 20 parts by weight, an organic vehicle: 58 parts by weight (obtained by dissolving 8 parts by weight of a polyvinyl butyral resin in 92 parts by weight of terpineol), bis(2 hethylhexyl) phthalate DOP as a plasticizer: 50 parts by weight, terpineol: 5 parts by weight, and a dispersant: 1 part by weight were added and kneaded by a ball mill to make slurry as an internal electrode paste.

Production of Electrode Level Difference Absorbing Print Paste

As ceramic powder and subcomponent additives, those as same as those used for the green sheet slurry were prepared to obtain the same compounding ratio.

Ceramic powder and subcomponent additives (150 g) was added with a dispersant of an ester based polymer (1.5 g), an imidazoline based antistatic agent (0.6 g), terpineol (50 g) and dioctyl phthalate as a plasticizer (5 g) and mixed for 4 hours. Next, the mixed solution was added with 8% lacquer (8 wt % of polyvinyl butyral and 92 wt % of terpineol with respect to the entire lacquer) of BH6 (a polyvinyl butyral resin having a polymerization degree of 1450 and a butyralation degree of 69 mol %±3%) made by Sekisui Chemical Co., Ltd. by an amount of 120 g and mixed for 16 hours. After that, 0 to 60 g of terpineol was added for viscosity adjustment to produce a paste.

As shown in Table 1 below, electrode level difference absorbing print pastes of sample numbers 1 to 8 were produced by changing a ceramic powder content (pigment concentration/wt %) with respect to the entire paste becomes 30 to 58 wt %, and viscosity of the pastes and the minimum possible printing thicknesses by the printing method (a print material thickness) were examined.

Note that viscosity of the paste was measured by using an RV20 type cone disc viscometer made by HAAKE when giving rotation of obtaining a shear rate of 8[1/s] at 25° C.

The results are shown in Table 1. As shown in Table 1, it was confirmed that the lower the pigment concentration is, the more preferable in order to lessen the printing thickness as much as possible (3 μm or less, preferably 2 μm or less, and more preferably 1 μm or less).

However, when the pigment concentration is too low, the viscosity declines. When the viscosity of the paste becomes lower than 4 Pa·s, a trouble that the paste flows out from a mesh of a print plate making was confirmed. Accordingly, the viscosity of the paste was confirmed to be preferably 4 Pa·s or more, and more preferably 7 Pa·s or more.

Also, when assuming that weight percentage of the ceramic powder in the paste is 58 wt %, which exceeds the upper limit of the preferable range of the present invention, the paste viscosity is heightened, and disadvantages that printing stability was deteriorated, etc. were observed.

Accordingly, to make a print thickness thinner and to improve print stability, the pigment concentration is preferably 30 to 55 wt %, and more preferably 35 to 50 wt %. Note that in Table 1, slashed portions indicate that troubles, such that blur of print material (low viscosity) and breaking of a printed material (release layer) (high viscosity) arise, etc. This will be the same in other Tables.

TABLE 1

|  | Polymerization Degree | Resin Amount [php] | Pigment Concentration [wt. %] | Butyralation Degree [mol. %] | Acetalization Degree [mol. %] | Plasticizer Amount [phr] | Antistatic Agent Kind | Viscosity [Pa·s] (at 8[1/s]) | Print Thickness [μm] |
|---|---|---|---|---|---|---|---|---|---|
| Sample1 | 1450 | 6 | 30 | 69 |  | 50 | Imidazoline Base | 4 | 0.7 |
| Sample2 | 1450 | ↓ | 34 | ↓ |  | ↓ | ↓ | 4 | 0.8 |
| Sample3 | 1450 | ↓ | 38 | ↓ |  | ↓ | ↓ | 5 | 1 |
| Sample4 | 1450 | ↓ | 42 | ↓ |  | ↓ | ↓ | 7 | 1.2 |
| Sample5 | 1450 | ↓ | 46 | ↓ |  | ↓ | ↓ | 11 | 1.6 |
| Sample6 | 1450 | ↓ | 50 | ↓ |  | ↓ | ↓ | 18 | 1.9 |
| Sample7 | 1450 | ↓ | 54 | ↓ |  | ↓ | ↓ | 30 | 2.2 |
| Sample8 | 1450 | ↓ | 58 | ↓ |  | ↓ | ↓ | 52 |  |

Formation of Green Sheet and Transfer of Adhesive Layer and Electrode Layer

First, by using the above dielectric green sheet slurry, a green sheet having a thickness of 1.2 μm was formed on the PET film (second supporting sheet) by using a wire bar coater. Next, the above release layer slurry was applied by a wire bar coater and dried to form a 0.2 μm release layer on another PET film (first supporting sheet).

On the surface of the release layer, an electrode layer 12a and a blank pattern layer 24 were formed. The electrode layer 12a was formed to be a thickness of 1 μm by the printing method using the above internal electrode layer paste. The blank pattern layer 24 was formed to be a thickness of 1 μm by the printing method using the above electrode level difference absorbing print paste. During the printing using the electrode level difference absorbing print paste, a disadvantage that the paste flows out from a mesh of a print plate making was not observed.

Also, an adhesive layer 28 was formed on another PET film (third supporting sheet). The adhesive layer 28 was formed to be a thickness of 0.1 μm by a wire bar coater by using the above adhesive layer slurry.

First, on the surface of the electrode layer 12a and the blank pattern layer 24, the adhesive layer 28 was transferred by a method shown in FIG. 2. At the time of transferring, a pair of rolls were used, the pressure force was 1 MPa, and the temperature was 80° C., and it was confirmed that the transfer was preferably performed.

Next, by a method shown in FIG. 3, an internal electrode layer 12a and blank pattern layer 24 were adhered (transferred) to a surface of the green sheet 10a via the adhesive layer 28. At the time of transferring, a pair of rolls were used, the pressure force was 1 MPa, and the temperature was 80° C., and it was confirmed that the transfer was preferably performed.

Next, by a method shown in FIG. 4 to FIG. 6, by successively stacking the internal electrode layers 12a and green sheets 10a, it was possible to finally stack 100 of the internal electrode layers 12a. As a result of observing the stacked body, it was confirmed that a level difference of an electrode layer between green sheets could be preferably eliminated and delamination between sheets and deformation of the stacked body, etc. could be effectively prevented.

Comparative Example 1

Other than using a polyvinyl butyral resin having a polymerization degree of 800, which is lower than that of a binder resin of the green sheet slurry, as a binder resin of the electrode level difference absorbing print paste, an electrode level difference absorbing print paste was produced in the same way as in the example 1. As a result, due to a decline of the viscosity, a disadvantage that the paste flows out from a mesh of a print plate making was observed.

Reference Example 1

Other than changing the weight percentage of the ceramic powder in the paste to less than 30 wt %, which is lower than the lower limit of the preferable range of the present invention, an electrode level difference absorbing print paste was produced in the same as in the example 1. As a result, due to a decline of the paste viscosity, a disadvantage that the paste flows out from a mesh of a print plate making was observed.

Example 2

As shown in Table 2 below, other than using a polyvinyl butyral resin having a polymerization degree of 1700 as a binder resin, electrode level difference absorbing print pastes of sample numbers 10 to 17 were produced, and viscosity of the paste and the minimum possible print thickness by the printing method were examined.

The results are shown in Table 2. As shown in Table 2, pigment concentration of 38 to 50 wt % was preferable when the polymerization degree was 1700.

TABLE 2

|  | Polymerization Degree | Resin Amount [php] | Pigment Concentration [wt. %] | Butyralation Degree [mol. %] | Acetalization Degree [mol. %] | Plasticizer Amount [phr] | Antistatic Agent Kind | Viscosity [Pa·s] (at 8[1/s]) | Print Thickness [μm] |
|---|---|---|---|---|---|---|---|---|---|
| Sample10 | 1700 | 6 | 30 | 69 |  | 50 | Imidazoline Base | 1 | 0.7 |
| Sample11 | 1700 | ↓ | 34 | ↓ |  | ↓ | ↓ | 3 | 0.8 |
| Sample12 | 1700 | ↓ | 38 | ↓ |  | ↓ | ↓ | 5 | 1 |
| Sample13 | 1700 | ↓ | 42 | ↓ |  | ↓ | ↓ | 9 | 1.2 |
| Sample14 | 1700 | ↓ | 46 | ↓ |  | ↓ | ↓ | 17 | 1.6 |
| Sample15 | 1700 | ↓ | 50 | ↓ |  | ↓ | ↓ | 29 | 2.1 |

TABLE 2-continued

|  | Polymerization Degree | Resin Amount [php] | Pigment Concentration [wt. %] | Butyralation Degree [mol. %] | Acetalization Degree [mol. %] | Plasticizer Amount [phr] | Antistatic Agent Kind | Viscosity [Pa · s] (at 8[1/s]) | Print Thickness [μm] |
|---|---|---|---|---|---|---|---|---|---|
| Sample16 | 1700 | ↓ | 54 | ↓ |  | ↓ | ↓ | 45 |  |
| Sample17 | 1700 | ↓ | 58 | ↓ |  | ↓ | ↓ | 70 |  |

Example 3

As shown in Table 3 below, other than using a polyvinyl butyral resin having a polymerization degree of 2000 as a binder resin, electrode level difference absorbing print pastes of sample numbers 20 to 27 were produced in the same way as in the example 1, and viscosity of the paste and the minimum possible print thickness by the printing method were examined.

The results are shown in Table 3. As shown in Table 3, pigment concentration of 34 to 46 wt % was preferable when the polymerization degree was 2000.

TABLE 3

|  | Polymerization Degree | Resin Amount [php] | Pigment Concentration [wt. %] | Butyralation Degree [mol. %] | Acetalization Degree [mol. %] | Plasticizer Amount [phr] | Antistatic Agent Kind | Viscosity [Pa · s] (at 8[1/s]) | Print Thickness [μm] |
|---|---|---|---|---|---|---|---|---|---|
| Sample20 | 2000 | 6 | 30 | 69 |  | 50 | Imidazoline Base | 1 | 0.7 |
| Sample21 | 2000 | ↓ | 34 | ↓ |  | ↓ | ↓ | 4 | 0.7 |
| Sample22 | 2000 | ↓ | 38 | ↓ |  | ↓ | ↓ | 6 | 1 |
| Sample23 | 2000 | ↓ | 42 | ↓ |  | ↓ | ↓ | 11 | 1.2 |
| Sample24 | 2000 | ↓ | 46 | ↓ |  | ↓ | ↓ | 20 | 1.6 |
| Sample25 | 2000 | ↓ | 50 | ↓ |  | ↓ | ↓ | 37 |  |
| Sample26 | 2000 | ↓ | 54 | ↓ |  | ↓ | ↓ | 64 |  |
| Sample27 | 2000 | ↓ | 58 | ↓ |  | ↓ | ↓ | 90 |  |

Example 4

As shown in Table 4 below, other than using a polyvinyl butyral resin having a polymerization degree of 2400 as a binder resin, electrode level difference absorbing print pastes of sample numbers 30 to 37 were produced in the same way as in the example 1, and viscosity of the paste and the minimum possible print thickness by the printing method were examined.

The results are shown in Table 4. As shown in Table 4, pigment concentration of 34 to 42 wt % was preferable when the polymerization degree was 2400.

TABLE 4

|  | Polymerization Degree | Resin Amount [php] | Pigment Concentration [wt. %] | Butyralation Degree [mol. %] | Acetalization Degree [mol. %] | Plasticizer Amount [phr] | Antistatic Agent Kind | Viscosity [Pa · s] (at 8[1/s]) | Print Thickness [μm] |
|---|---|---|---|---|---|---|---|---|---|
| Sample30 | 2400 | 6 | 30 | 69 |  | 50 | Imidazoline Base | 2 | 0.6 |
| Sample31 | 2400 | ↓ | 34 | ↓ |  | ↓ | ↓ | 5 | 0.7 |
| Sample32 | 2400 | ↓ | 38 | ↓ |  | ↓ | ↓ | 10 | 1 |
| Sample33 | 2400 | ↓ | 42 | ↓ |  | ↓ | ↓ | 16 | 1.3 |
| Sample34 | 2400 | ↓ | 46 | ↓ |  | ↓ | ↓ | 31 |  |
| Sample35 | 2400 | ↓ | 50 | ↓ |  | ↓ | ↓ | 47 |  |
| Sample36 | 2400 | ↓ | 54 | ↓ |  | ↓ | ↓ | 77 |  |
| Sample37 | 2400 | ↓ | 58 | ↓ |  | ↓ | ↓ | 115 |  |

Example 5

As shown in Table 5 below, other than using a polyvinyl butyral resin having a polymerization degree of 3000 as a binder resin, electrode level difference absorbing print pastes of sample numbers 40 to 47 were produced in the same way as in the example 1, and viscosity of the paste and the minimum possible print thickness by the printing method were examined.

The results are shown in Table 5. As shown in Table 5, pigment concentration of 30 to 38 wt % was preferable when the polymerization degree was 3000.

Also, from the results of the examples 1 to 5, it was confirmed that to make the print thickness as thin as possible (3 μm or less, preferably 2 μm or less, and more preferably 1 μm or less), the polymerization degree of the binder resin in the electrode level difference absorbing print paste was higher than that of the binder resin of the green sheet slurry, more preferably 1400 or higher, more preferably 1450 or higher, and particularly preferably 2000 or higher.

TABLE 5

|  | Polymerization Degree | Resin Amount [php] | Pigment Concentration [wt. %] | Butyralation Degree [mol. %] | Acetalization Degree [mol. %] | Plasticizer Amount [phr] | Antistatic Agent Kind | Viscosity [Pa·s] (at 8[1/s]) | Print Thickness [μm] |
|---|---|---|---|---|---|---|---|---|---|
| Sample40 | 3000 | 6 | 30 | 69 |  | 50 | Imidazoline Base | 4 | 0.5 |
| Sample41 | 3000 | ↓ | 34 | ↓ |  | ↓ | ↓ | 7 | 0.8 |
| Sample42 | 3000 | ↓ | 38 | ↓ |  | ↓ | ↓ | 15 | 1.1 |
| Sample43 | 3000 | ↓ | 42 | ↓ |  | ↓ | ↓ | 30 |  |
| Sample44 | 3000 | ↓ | 46 | ↓ |  | ↓ | ↓ | 50 |  |
| Sample45 | 3000 | ↓ | 50 | ↓ |  | ↓ | ↓ | 84 |  |
| Sample46 | 3000 | ↓ | 54 | ↓ |  | ↓ | ↓ | 131 |  |
| Sample47 | 3000 | ↓ | 58 | ↓ |  | ↓ | ↓ | 200 |  |

Example 6

As shown in Table 6 below, other than using a polyvinyl butyral resin having a polymerization degree of 2000 as a binder resin, and making a weight ratio (resin amount) of the binder resin with respect to 100 parts by weight of the ceramic powder to 2 to 10 parts by weight, electrode level difference absorbing print pastes of sample numbers 50 to 54 were produced in the same way as in the example 1, and viscosity of the paste, the minimum possible print thickness by the printing method and film density were examined.

The film density was obtained by coating the electrode level difference absorbing print paste by using an applicator having a gap of 250 μm to form a film, drying at 100° C. for 15 minutes, and calculated from a thickness and weight of a certain area.

The results are shown in Table 6. As shown in Table 6, as the resin amount increases, the film density becomes lower and thin film printing becomes difficult, while as the resin amount decreases, strength of the film declines and handlability declines. Accordingly, the resin amount is preferably 3 to 9 parts by weight, and more preferably 4 to 8 parts by weight.

TABLE 6

|  | Polymerization Degree | Resin Amount [php] | Pigment Concentration [wt. %] | Butyralation Degree [mol. %] | Acetalization Degree [mol. %] | Plasticizer Amount [phr] | Antistatic Agent Kind | Viscosity [Pa·s] (at 8[1/s]) | Print Thickness [μm] | Film Density [g/cm3] |
|---|---|---|---|---|---|---|---|---|---|---|
| Sample50 | 2000 | 2 | 42 | 69 |  | 50 | Imidazoline Base | 2 | 1.0 | 3.8 |
| Sample51 | ↓ | 4 | ↓ | ↓ |  | ↓ | ↓ | 4 | 1.1 | 3.8 |
| Sample52 | ↓ | 6 | ↓ | ↓ |  | ↓ | ↓ | 11 | 1.2 | 3.6 |
| Sample53 | ↓ | 8 | ↓ | ↓ |  | ↓ | ↓ | 20 | 1.3 | 3.4 |
| Sample54 | ↓ | 10 | ↓ | ↓ |  | ↓ | ↓ | 35 |  |  |

Example 7

As shown in Table 7 below, other than using a polyvinyl butyral resin having a polymerization degree of 2400 as a binder resin, and changing a butyralation degree thereof to be in a range of 77 to 63 mol %, electrode level difference absorbing print pastes of sample numbers 60 to 64 were produced in the same way as in the example 1, and viscosity of the paste, the minimum possible print thickness by the printing method and surface roughness (Ra: μm) of the print film were examined.

The surface roughness was obtained by printing the electrode level difference absorbing print paste on a green sheet by the screen printing method, dried at 80° C. for 5 minutes, and measuring the surface roughness (Ra) of an obtained electrode layer. The measurement was made by using a Surfcorder (SE-30D) (product name) made by Kosaka Laboratories Ltd.

The results are shown in Table 7. As shown in Table 7, as the butyralation degree becomes lower, the resin becomes hard to be dissolved and the surface roughness deteriorates, while as the degree becomes higher, the paste viscosity declines. Accordingly, the butyralation degree of the binder resin is preferably in a range of 64 to 74 mol %.

TABLE 7

| | Polymerization Degree | Resin Amount [php] | Pigment Concentration [wt. %] | Butyralation Degree [mol. %] | Acetalization Degree [mol. %] | Plasticizer Amount [phr] | Antistatic Agent Kind | Viscosity [Pa·s] (at 8[1/s]) | Print Thickness [μm] | Surface Roughness Ra [μm] |
|---|---|---|---|---|---|---|---|---|---|---|
| Sample 60 | 2400 | 6 | 42 | 77 | | 50 | Imidazoline Base | 3 | 1.2 | 0.55 |
| Sample 61 | ↓ | ↓ | ↓ | 74 | | ↓ | ↓ | 8 | 1.3 | 0.59 |
| Sample 62 | ↓ | ↓ | ↓ | 69 | | ↓ | ↓ | 16 | 1.3 | 0.62 |
| Sample 63 | ↓ | ↓ | ↓ | 66 | | ↓ | ↓ | 20 | 1.4 | 0.91 |
| Sample 64 | ↓ | ↓ | ↓ | 63 | | ↓ | ↓ | 33 | | |

Example 8

As shown in Table 8 below, other than using a polyvinyl acetal resin having a polymerization degree of 2400 as a binder resin, and changing an acetalization degree thereof to be in a range of 77 to 63 mol %, electrode level difference absorbing print pastes of sample numbers 70 to 74 were produced in the same way as in the example 1, and viscosity of the paste, the minimum possible print thickness by the printing-method and surface roughness (Ra: μm) of the print film were examined. The surface roughness was measured ion the same way as that in the example 7.

The results are shown in Table 8. As shown in Table 8, as the acetalization degree becomes higher, the resin becomes hard to be dissolved and the surface roughness deteriorates, while as the degree becomes lower, the paste viscosity declines. Accordingly, the acetalization degree of the binder resin is preferably in a range of 66 to 74 mol %.

TABLE 8

| | Polymerization Degree | Resin Amount [php] | Pigment Concentration [wt. %] | Butyralation Degree [mol. %] | Acetalization Degree [mol. %] | Plasticizer Amount [phr] | Antistatic Agent Kind | Viscosity [Pa·s] (at 8[1/s]) | Print Thickness [μm] | Surface RoughnessRa [μm] |
|---|---|---|---|---|---|---|---|---|---|---|
| Sample 70 | 2400 | 6 | 42 | | 77 | 50 | Imidazoline Base | 36 | | |
| Sample 71 | ↓ | ↓ | ↓ | | 74 | ↓ | ↓ | 28 | 1.4 | 0.92 |

TABLE 8-continued

|  | Polymerization Degree | Resin Amount [php] | Pigment Concentration [wt. %] | Butyralation Degree [mol. %] | Acetalization Degree [mol. %] | Plasticizer Amount [phr] | Antistatic Agent Kind | Viscosity [Pa · s] (at 8[1/s]) | Print Thickness [μm] | Surface RoughnessRa [μm] |
|---|---|---|---|---|---|---|---|---|---|---|
| Sample 72 | ↓ | ↓ | ↓ |  | 71 | ↓ | ↓ | 23 | 1.4 | 0.81 |
| Sample 73 | ↓ | ↓ | ↓ |  | 66 | ↓ | ↓ | 14 | 1.3 | 0.63 |
| Sample 74 | ↓ | ↓ | ↓ |  | 63 | ↓ | ↓ | 3 | 1.3 | 0.60 |

Example 9

As shown in Table 9 below, other than using a polyvinyl butyral resin having a polymerization degree of 2000 as a binder resin, and making dioctyl phthalate as a plasticizer contained at a ratio of 0 to 150 parts by weight with respect to 100 parts by weight of the binder resin, electrode level difference absorbing print pastes of sample numbers 80 to 84 were produced in the same way as in the example 1, and viscosity of the paste, the minimum possible print thickness by the printing method and a PET release force (mN/cm) were examined.

Measurement of the PET release force was obtained by pulling up one end of the carrier sheet 20 in the direction of 90 degrees with respect to the plane of the stacked body at a rate of 8 mm/min., for example, in a state shown in FIG. 3B, and a force (mN/cm) applied to the carrier sheet 20 was considered as release strength. Since the carrier sheet 20 positions on the release layer 22 side, the release strength of the carrier sheet 20 was indicated as a PET release force on the release layer side in Table 9.

The results are shown in Table 9. As shown in FIG. 9, when an amount of the plasticizer is small, a release trouble (breaking) arises due to the heavy release, while when the plasticizer amount is large, the plasticizer remains as a nonvolatile component on the print film and the printing material becomes hard to be rolled up. Accordingly, the plasticizer is contained by preferably 10 to 200 parts by weight, more preferably 20 to 150 parts by weight, further preferably 30 to 100 parts by weight, and particularly preferably 50 to 100 parts by weight with respect to 100 parts by weight of the binder resin.

Example 10

As shown in Table 10 below, other than using a polyvinyl butyral resin having a polymerization degree of 2000 as a binder resin and using any one of polyethylene glycol (a hygroscopic polymer), polyalkylene glycol derivative based surfactant (amphoteric surfactant), carboxylic acid amidine salt based surfactant (amphoteric surfactant), and imidazoline based surfactant (amphoteric surfactant) as an antistatic agent, or not adding any antistatic agent, electrode level difference absorbing print pastes of sample numbers 90 to 94 were produced in the same way as in the example 1, and viscosity of the paste, the minimum possible thickness by the printing method and a static electricity amount (kV) were examined.

Note that the static electricity amount was evaluated as below. Namely, measurement was made by using S55-1 made by SHINKO Corporation immediately after removing the support sheet 20 shown in FIG. 3B and by making a distance from the blank layer 24 to be 1 cm. The measurement value is a value measured after 5 seconds from removal. The less the static electricity (kV) to be generated is, the more preferable. When electrostatic generates, the sheet gets wrinkled, so that stacking with high accuracy becomes difficult.

In Table 10, 1-hydroxyethyl 2-alkylimidazoline quarternary salt was used as an imidazoline based surfactant.

As shown in Table 10, it was confirmed that the static electricity can be reduced by making an antistatic agent contained comparing with the sample 94 with no antistatic agent contained therein. Also, imidazoline based antistatic agents were confirmed to be preferable among them.

TABLE 9

|  | Polymerization Degree | Resin Amount [php] | Pigment Concentration [wt. %] | Butyralation Degree [mol. %] | Acetalization Degree [mol. %] | Plasticizer Amount [phr] | Antistatic Agent Kind | Viscosity [Pa · s] (at 8[1/s]) | Print Thickness [μm] | PET Release Force [mN/cm] |
|---|---|---|---|---|---|---|---|---|---|---|
| Sample80 | 2000 | 6 | 42 | 69 |  | 0 | Imidazoline Base | 12 | 1.1 | 35 |
| Sample81 | ↓ | ↓ | ↓ | ↓ |  | 10 | ↓ | 12 | 1.1 | 25 |
| Sample82 | ↓ | ↓ | ↓ | ↓ |  | 30 | ↓ | 12 | 1.2 | 20 |
| Sample83 | ↓ | ↓ | ↓ | ↓ |  | 50 | ↓ | 12 | 1.2 | 16 |
| Sample84 | ↓ | ↓ | ↓ | ↓ |  | 80 | ↓ | 12 | 1.2 | 14 |
| Sample85 | ↓ | ↓ | ↓ | ↓ |  | 100 | ↓ | 11 | 1.3 | 10 |
| Sample86 | ↓ | ↓ | ↓ | ↓ |  | 150 | ↓ | 10 | 1.3 | Unmeasurable |

TABLE 10

|  | Polymerization Degree | Resin Amount [php] | Pigment Concentration [wt. %] | Butyralation Degree [mol. %] | Acetalization Degree [mol. %] | Plasticizer Amount [phr] | Antistatic Agent Kind | Viscosity [Pa·s] (at 8[1/s]) | Print Thickness [μm] | Static Electricity Amount [kV] |
|---|---|---|---|---|---|---|---|---|---|---|
| Sample90 | 2000 | 6 | 42 | 69 |  | 50 | *1 | 12 | 1.1 | 12 |
| Sample91 | ↓ | ↓ | ↓ | ↓ |  | ↓ | *2 | 12 | 1.2 | 11 |
| Sample92 | ↓ | ↓ | ↓ | ↓ |  | ↓ | *3 | 12 | 1.2 | 13 |
| Sample93 | ↓ | ↓ | ↓ | ↓ |  | ↓ | *4 | 12 | 1.2 | 4 |
| Sample94 | ↓ | ↓ | ↓ | ↓ |  | ↓ | None | 11 | 1.2 | 36 |

*1: polyethylene glycol
*2: polyalkylene glycol derivative based surfactant
*3: carboxylic acid amidine salt based surfactant
*4: imidazoline based surfactant

EFFECTS OF THE INVENTION

As explained above, according to the present invention, it is possible to provide an electrode level difference absorbing print paste capable of eliminating a level difference on an electrode layer between green sheets and effectively preventing delamination between sheets and deformation of a stacked body even when a thickness of the green sheet and/or electronic layer is extremely thin, and a production method of an electronic device. Therefore, an electrode level difference absorbing print paste suitable to make an electronic device thinner and multilayered, and a production method of an electronic device can be provided.

The invention claimed is:

1. An electrode level difference absorbing print paste comprising ceramic powder, a binder resin, a plasticizer and a solvent, wherein:

said binder resin comprises a polyvinyl butyral resin or a polyacetal resin, a polymerization degree of the resin is 1400 or more, a butyralation degree of the resin is 64 to 74 mol %, an acetalization degree of the resin is 66 to 74 mol %, a content of the binder resin is 3 parts by weight or more and 9 parts by weight or less with respect to 100 parts by weight of said ceramic powder;

said solvent comprises at least one of terpineol, dihydroterpineol, terpinyl acetate, dihydroterpinyl acetate and 4-(1'-acetoxy-1'-)cyclohexanol acetate, a content of the solvent is 50 to 70 parts by weight with respect to 100 parts by weight of the paste, a content of the ceramic powder is 30 to 55 wt % with respect to a total weight of the paste, a viscosity of the electrode level difference absorbing print paste is 4 to 30 Pa's when being given rotation of obtaining a shear rate of 8[1/s], and a content of the plasticizer is 50 to 100 parts by weight with respect to 100 parts by weight of the binder resin.

2. The electrode level difference absorbing print paste as set forth in claim 1, comprising at least one of phthalate ester, adipic acid ester, sebacic acid ester and sebacic dibutyl as said plasticizer.

3. The electrode level difference absorbing print paste as set forth in claim 1, further comprising at least one of a hygroscopic polymer, cation based surfactant and amphoteric surfactant as an antistatic agent.

4. The electrode level difference absorbing print paste as set forth in claim 2, wherein:

the phthalate ester is selected from the group consisting of dibutyl phthalate (DBP), dioctyl phthalate (DOP), benzylbutyl phthalate (BBP), butyl butylene glycol (BPBG), and the adipic acid ester is dioctyl adipic acid (DOA).

5. The electrode level difference absorbing print paste as set forth in claim 3, wherein said cation based surfactant is an amine based surfactant.

* * * * *